US006925571B1

(12) United States Patent
Motoyama et al.

(10) Patent No.: US 6,925,571 B1
(45) Date of Patent: Aug. 2, 2005

(54) METHOD AND SYSTEM OF REMOTE MONITORING AND SUPPORT OF DEVICES, USING POP3 AND DECRYPTION USING VIRTUAL FUNCTION

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 795 days.

(21) Appl. No.: 09/975,935

(22) Filed: Oct. 15, 2001

(51) Int. Cl.$^7$ .............................................. G06F 1/24
(52) U.S. Cl. ...................................... 713/200; 713/201
(58) Field of Search ................................. 713/200, 201

(56) References Cited

U.S. PATENT DOCUMENTS

| | | |
|---|---|---|
| 5,412,779 A | 5/1995 | Motoyama |
| 5,537,554 A | 7/1996 | Motoyama |
| 5,544,289 A | 8/1996 | Motoyama |
| 5,568,618 A | 10/1996 | Motoyama |
| 5,649,120 A | 7/1997 | Motoyama |
| 5,774,678 A | 6/1998 | Motoyama |
| 5,818,603 A | 10/1998 | Motoyama |
| 5,819,110 A | 10/1998 | Motoyama |
| 5,848,386 A | 12/1998 | Motoyama |
| 5,887,216 A | 3/1999 | Motoyama |
| 5,909,493 A | 6/1999 | Motoyama |
| 6,085,196 A | 7/2000 | Motoyama et al. |
| 6,208,956 B1 | 3/2001 | Motoyama |
| 6,279,015 B1 | 8/2001 | Fong et al. |
| 6,330,628 B1 | 12/2001 | Motoyama |
| 6,757,714 B1 | 6/2004 | Hansen |

FOREIGN PATENT DOCUMENTS

JP 2-172348 7/1990

*Primary Examiner*—Thomas R. Peeso
(74) *Attorney, Agent, or Firm*—Oblon, Spivak, McClelland, Maier & Neustadt, P.C.

(57) ABSTRACT

A method involves retrieving from an email message, information concerning at least one remotely monitored device. The method involves obtaining a line of the email message containing the information, decoding the line obtained from the email message if it has been encoded, and decrypting the decoded line. The decrypting involves using an abstract decrypter class configured to perform a virtual function and using any one of a plurality of derived decrypter classes each of which is configured as a derived class of the abstract decrypter class. The abstract decrypter class and the any one of the derived decrypter classes are collectively configured to decrypt the decoded email message, using the any one of the derived decrypter classes with the abstract decrypter class without having to modify the abstract decrypter class. An exemplary system for remotely monitoring devices uses the SMTP email protocol to send status, configuration, or other information concerning at least one of the devices in a MIME attachment of an email message. A POP3 processing module in the receiver of the email has a class structure. An interface class accesses an email server and obtain the email message including the MIME attachment. An extractor class extracts the MIME attachment from the email message, and a decoder class performs Base64 decoding of the attachment. An abstract decrypter class and each of plural derived decrypter classes configured as a derived class thereof, permit flexibility in adopting new decryption processes without having to modify the abstract decrypter class.

11 Claims, 30 Drawing Sheets

US 6,925,571 B1

METHOD AND SYSTEM OF REMOTE MONITORING AND SUPPORT OF DEVICES, USING POP3 AND DECRYPTION USING VIRTUAL FUNCTION

CROSS-REFERENCE TO RELATED APPLICATIONS

The present application is related to U.S. patent application Ser. No. 09/190,460, filed Nov. 13, 1998, entitled "Method and System for Translating Documents Using Different Translation Resources for Different Portions of the Documents," which is a continuation of U.S. patent application Ser. No. 08/654,207, filed May 28, 1996, entitled "Method and System for Translating Documents Using Different Translation Resources for Different Portions of the Documents," now U.S. Pat. No. 5,848,386; U.S. patent application Ser. No. 08/997,705, filed Dec. 23, 1997, entitled "Object-oriented System and Computer Program Product for Mapping Structured Information to Different Structured Information," now U.S. Pat. No. 6,085,196; U.S. patent application Ser. No. 08/997,705, filed Dec. 23, 1997, entitled "Method and Apparatus for Providing a Graphical User Interface for Creating and Editing a Mapping of a First Structural Description to a Second Structural Description"; U.S. patent application Ser. No. 09/756,120 filed Jan. 9, 2001, entitled "Method and System of Remote Support Of Device Using Email"; U.S. patent application Ser. No. 09/668,162, filed Sep. 25, 2000, entitled "Method and System of Data collection and Mapping From a Remote Position Reporting Device"; U.S. patent application Ser. No. 09/575,710, filed Jul. 25, 2000, entitled "Method and System of Remote Diagnostic and Information Collection and Service System"; U.S. patent application Ser. No. 09/575,702, filed Jul. 12, 2000, entitled "Method and System of Remote Position Report Device"; U.S. patent application Ser. No. 09/453,934, filed May 17, 2000, entitled "Method and System of Remote Diagnostic, Control and Information Collection Using a Dynamic Linked Library for Multiple Formats and Multiple Protocols"; U.S. patent application Ser. No. 09/453,935, filed May 17, 2000, entitled "Method and System of Remote Diagnostic, Control and Information Collection Using a Dynamic Linked Library of Multiple Formats and Multiple Protocols With Intelligent Protocol Processor"; U.S. patent application Ser. No. 09/453,937, filed May 17, 2000, entitled "Method and System of Remote Diagnostic, Control and Information Collection Using a Dynamic Linked Library of Multiple Formats and Multiple Protocols With Restriction on Protocol"; U.S. patent application Ser. No. 09/453,936, filed May 17, 2000, entitled "Method and System of Remote Diagnostic, Control and Information Collection Using a Dynamic Linked Library of Multiple Formats and Multiple Protocols with Intelligent Formatter"; U.S. patent application Ser. No. 09/542,284, filed Apr. 4, 2000, entitled "System and Method to Display Various Messages While Performing the Tasks or While Idling"; U.S. patent application Ser. No. 09/520,368, filed on Mar. 7, 2000, entitled "Method and System for Updating the Device Driver of a Business Office Appliance"; U.S. patent application Ser. No. 09/453,877, filed Feb. 4, 2000, entitled "Method and System for Maintaining a Business Office Appliance through Log Files"; U.S. patent application Ser. No. 09/440,692, filed Nov. 16, 1999, entitled "Method and System to Monitor the Application Usage and Send Back the Information Using Connection and Connectionless Mode"; U.S. patent application Ser. No. 09/440,693, filed Nov. 16, 1999, entitled "Method and System of Remote Diagnostic, Control and Information Collection Using a Dynamic Linked Library"; U.S. patent application Ser. No. 09/440,647, filed Nov. 16, 1999, entitled "Method and System to Monitor the Application Usage and Send Back the Information Using Connection and Connectionless Mode"; U.S. patent application Ser. No. 09/440,646, filed Nov. 16, 1999, entitled "Method and System to Monitor the Application Usage and Send Back the Information Using Connection and Connectionless Mode"; U.S. patent application Ser. No. 09/440,645, filed Nov. 16, 1999, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manager"; U.S. patent application Ser. No. 09/407,769, filed Sep. 29, 1999, entitled "Method and System for Remote Diagnostic, Control and Information Collection Based on various Communication Modes for Sending Messages to Users"; U.S. patent application Ser. No. 09/393,677, filed Sep. 10, 1999, entitled "Application Unit Monitoring and Reporting System and Method"; U.S. patent application Ser. No. 09/311,148, filed May 13, 1999, entitled "Application Unit Monitoring and Reporting System and Method", U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26, 1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216; U.S. patent application Ser. No. 08/733,134, filed Oct. 16, 1996, entitled "Method and System for Diagnosis and Control of Machines Using Connectionless Modes of Communication," now U.S. Pat. No. 5,909,493; U.S. patent application Ser. No. 08/880,683, filed Jun. 23, 1997, U.S. patent applications Ser. Nos. 09/107,989 and 09/108,705, both of which were filed Jul. 1, 1998, all three of which are entitled "Method and System for Controlling and Communicating with Machines Using Multiple Communication Formats," and all three of which are divisions of U.S. patent application Ser. No. 08/624,228, filed Mar. 29, 1996, entitled "Method and System for Controlling and Communicating with Machines Using Multiple Communication Formats," now U.S. Pat. No. 5,818,603; U.S. patent application Ser. No. 09/457,669, entitled "Method and System for Diagnosis and Control of Machines Using Connection and Connectionless Modes of Communication," filed Dec. 9, 1999, which is a continuation of U.S. patent application Ser. No. 08/916,009, entitled "Method and System for Diagnosis and Control of Machines Using Connection and Connectionless Modes of Communication," filed Aug. 21, 1997, which is a continuation of, and U.S. patent applications Ser. Nos. 08/738,659 and 08/738,461, filed Oct. 30, 1996, both of which are entitled "Method and System for Diagnosis and Control of Machines Using Connection and Connectionless Modes of Communication," which are divisions of, U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110; and U.S. patent application Ser. No. 08/852,413, filed May 7, 1987, entitled "Method and System for Controlling and Communicating with Business Office Devices," now U.S.

Pat. No. 5,774,678, which is a continuation of U.S. patent application Ser. No. 08/698,068, filed Aug. 15, 1996, entitled "Method and Apparatus for Controlling and Communicating With Business Office Devices", now U.S. Pat. No. 5,649,120, which is a continuation of U.S. patent application Ser. No. 08/562,192, filed Nov. 22, 1995, now U.S. Pat. No. 5,568,618, entitled "Method and Apparatus for Controlling and Communicating With Business Office Devices", which is a continuation of U.S. patent application Ser. No. 08/473,780, filed Jun. 6, 1995, entitled "Method and Apparatus for Controlling and Communicating With Business Office Devices", now U.S. Pat. No. 5,544,289, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, which is a continuation of U.S. patent application Ser. No. 08/282,168, filed Jul. 28, 1994, entitled "Method and Apparatus for Controlling and Communicating With Business Office Devices", now U.S. Pat. No. 5,412,779, which is a continuation of U.S. patent application Ser. No. 07/902,462, fled Jun. 19, 1992, now abandoned, which is a continuation of U.S. patent application Ser. No. 07/549,278, filed Jul. 6, 1990, now abandoned; U.S. patent application Ser. No. 09/953,357, filed Sep. 17, 2001, entitled "System, Method, and Computer Program Product for Collecting and Sending Various Types of Information to a Monitor Using E-Mail"; U.S. patent application Ser. No. 09/953,358, filed Sep. 17, 2001, entitled "System, Method, and Computer Program Product for Transferring Remote Device Support Data to a Monitor Using E-Mail"; U.S. patent application Ser. No. 09/953,359, filed Sep. 17, 2001, entitled "System, Method, and Computer Program Product for Sending Remote Device Configuration Information to a Monitor Using E-Mail"; U.S. patent application Ser. No. 09/975,939, filed concurrently herewith on Oct. 15, 2001, entitled "Method And System of Remote Monitoring and Support of Devices, Extracting Data From Different Types of Email Messages, and Storing Data According to Data Structures Determined by the Message Types"; U.S. patent application Ser. No. 09/975,938, filed concurrently herewith on Oct. 15, 2001, entitled "Method and System of Remote Monitoring and Support of Devices, Including Handling Email Messages Having Message Types Specified Within the Email Message"; U.S. patent application Ser. No. 09/935, filed concurrently herewith on Oct. 15, 2001, entitled "Method and System of Remote Monitoring and Support of Devices, Using POP3 and Decryption Using Virtual Function"; the disclosure of each is incorporated herein by reference.

BACKGROUND OF THE INVENTION

1. Field of the Invention

The invention relates to various methods, systems, computer program products, and other arrangements for remotely monitoring any of a variety of appliances or devices, for sending monitoring information across any of various networks, for receiving the monitoring information, and for storing and analyzing the monitored information.

2. Discussion of the Background

With the advent of microprocessors, microprocessor-based appliances and devices have become more intelligent. In addition, the increase of networking through wireline and wireless technology makes communication among those intelligent appliances and devices possible. The next extension to this development is to create systems in which the configuration and status of these appliances and devices are monitored and sent by a monitoring system to a receiving system.

In order that information can be sent over non-secure networks such as the Internet, the information can be encrypted. Because a wide variety of encryption techniques are available, a user must choose which technique to encrypt and decrypt the emails, which level of encryption to use, and even whether to use encryption at all. However, conventional systems require that significant software modifications be made if the encryption/decryption technique is to be changed, if the level of encryption is to be changed, or even if a user wants no encryption. Such software modifications have involved more than swapping the encryption/decryption software itself: the software with which the encryption/decryption software cooperated also had to be modified. This requirement to substantially modify software other than the encryption/decryption software itself shows a lack of flexibility that has resulted in increased cost and time delay.

SUMMARY OF THE INVENTION

Applicants have recognized that, for the sake of flexibility it is desirable to be able to quickly and easily change the encryption/decryption technique used, to easily change a level of encryption, or even to choose not to encrypt the emails at all. To make these changes easy to accomplish efficiently, it is important that the software other than the encryption/decryption software itself not have to be changed when a change is made to the encryption/decryption software. The present invention achieves this goal.

The present invention provides a method of retrieving from an email message, information concerning at least one remotely monitored device. The method involves obtaining a line of the email message containing the information, decoding the line obtained from the email message if it has been encoded, and decrypting the decoded line. The decrypting involves using an abstract decrypter class configured to perform a virtual function and using any one of a plurality of derived decrypter classes each of which is configured as a derived class of the abstract decrypter class. The abstract decrypter class and the any one of the derived decrypter classes are collectively configured to decrypt the decoded email message, using the any one of the derived decrypter classes with the abstract decrypter class without having to modify the abstract decrypter class.

An embodiment of an inventive system for remotely monitoring devices uses a predetermined (for example, SMTP) email protocol to send status, configuration, or other information concerning at least one of the devices via email. In one embodiment, the information is in an attachment to the email, such as a MIME attachment. An exemplary processing module in the receiver of the email has a class structure. An interface class is configured to access an email server that is governed by the POP3 protocol, and to obtain the email message that contains the information. An extractor class is configured to extract the portion of the email message, such as the MIME attachment. A decoder class is configured to perform decoding, such as Base64 decoding, of the extracted portion. An abstract decrypter class is configured to perform a virtual function, and each of plural derived decrypter classes is configured as a derived class of the abstract decrypter class. To permit flexibility in adopting new decryption processes, the abstract decrypter class and the derived decrypter classes are collectively configured to perform the decryption operation, using any one of the derived decrypter classes with the abstract decrypter class without having to modify the abstract decrypter class.

Other objects, features and advantages of the present invention will be apparent to those skilled in the art upon a reading of this specification including the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to like elements throughout, and in which.

DETAILED DESCRIPTION OF THE PREFERRED EMBODIMENTS

Figure 1:
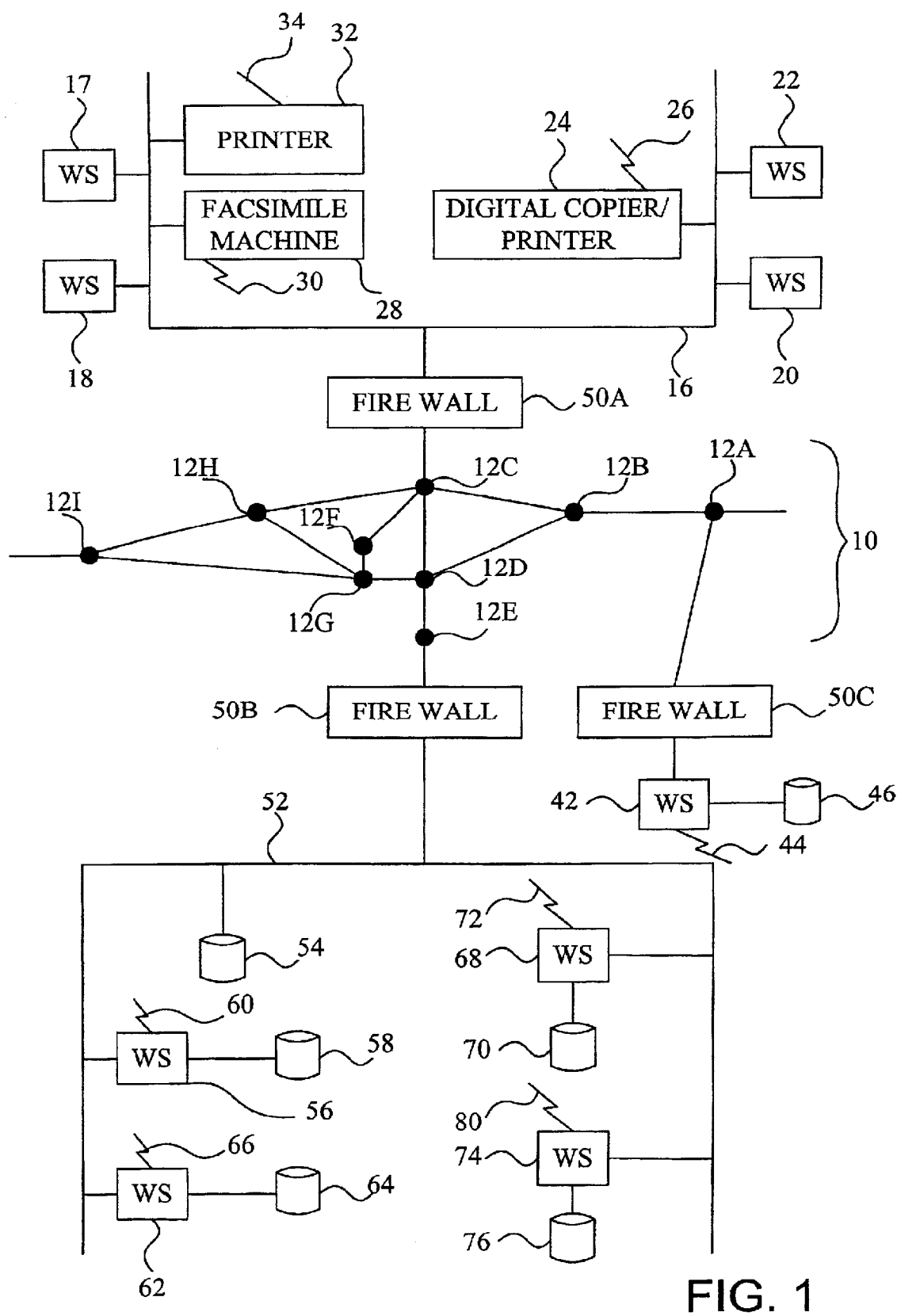
FIG. 1 illustrates three networked business office machines connected to a network of computers and databases through the Internet.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Referring now to the drawings, wherein like reference numerals designate identical or corresponding parts throughout the several views, and more particularly to FIG. 1 thereof, there are illustrated various machines, along with computers for monitoring, diagnosing and controlling the operation of the machines. In FIG. 1, there is a first network 16, such as a Local Area Network (LAN), connected to computer workstations 17, 18, 20 and 22. The workstations can be any type of computers including, e.g., IBM Personal Computer compatible devices, Unix-based computers, Linux-based computers or Apple Macintoshes. Also connected to the network 16 are a digital image forming apparatus 24, a facsimile machine 28, and a printer 32.

As appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to herein as machines or monitored devices, and other types of devices may be used as the machines or monitored devices, including any of the devices discussed below.

In some configurations, one or more workstations may be converted to business office appliances. One example of such a business office appliance is eCabinet from Ricoh that was demonstrated at Fall Comdex in 1999 at Las Vegas.

Also, a facsimile server (not illustrated) may be connected to the network 16 and have a telephone, ISDN (Integrated Services Digital Network), cable or wireless connection. In addition to the digital image forming apparatus 24, facsimile machine 28, and printer 32 being connected to the network 16, these devices may also include conventional telephone and/or ISDN and/or cable and/or wireless connections 26, 30 and 34, respectively. As explained below, the business office machines, business devices or business office appliances 24, 28 and 32 communicate with a remote monitoring, diagnosis and control station, also referred to as a monitoring device, through the Internet via the network 16 or by a direct telephone, ISDN, wireless, or cable connection.

In FIG. 1, a wide area network (WAN) (e.g., the Internet or its successor) is generally designated by 10. The WAN 10 can either be a private WAN, a public WAN or a hybrid. The WAN 10 includes a plurality of interconnected computers and routers designated by 12A–12I. The manner of communicating over a WAN is known through a series of RFC documents obtained by HTTP//:www.ietf.org/rfc.html, including RFC 821 entitled "Simple Mail Transfer Protocol" from Internet Engineering Task Force (IETF); RFC 822 entitled "Standard for the Format of ARPA Internet Text Message" from EETF; RFC 959 entitled "File Transfer Protocol (FTP)" from IETF; RFC 2045 entitled "Multipurpose Internet Mail Extensions (MIME) Part One: Format of Internet Message Bodies" from IETF; RFC 1894 entitled "An Extensible Message Format for Delivery Status Notifications"; RFC 1939 entitled "Post Office protocol—Version 3"; and RFC 2298 entitled "An Extensible Message Format for Message Disposition Notifications." The contents of each of these references are incorporated herein by reference.

TCP/IP related communication is described, for example, in the book "TCP/IP Illustrated," Vol. 1, The Protocols, by W. R. Stevens, from Addison-Wesley Publishing Company, 1994, which is incorporated herein by reference. Volumes 1–3 of "Internetworking with TCP/IP" by Comer and Stevens are also incorporated herein by reference in their entirety.

In FIG. 1, a firewall 50A is connected between the WAN 10 and the network 16. A firewall allows only authorized computers on one side of the firewall to access a network, computers or individual parts on the other side of the firewall. Firewalls are known and commercially available devices and/or software (e.g., SunScreen from Sun Microsystems Inc.). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, Addison-Wesley Publishing, and "Building Internet Firewalls" by D. B. Chapman and E. D. Zwicky, 1995, O'Reilly & Associates, Inc. The contents of those references are incorporated herein by reference.

The network 52 is a conventional network and includes a plurality of workstations 56, 62, 68 and 74. These workstations may be in different departments (e.g., marketing, manufacturing, design engineering and customer service departments) within a single company.

In addition to the workstations connected via the network 52, there is a workstation 42, which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable that typically is used to carry television programming, a cable that provides high speed communication of digital data typically used with computers or the like, or any other desired type of cable.

Information of the business office machines, business devices or business office appliances 24, 28 and 32 may be stored in one or more of the databases stored in the disks 46, 54, 58, 64, 70 and 76. Exemplary databases include SQL databases by Microsoft, IBM, Oracle and Sybase, as well as other relational databases, and non-relational databases (including object oriented databases from Computer Associates, JYD Software Engineering, and Orient Technologies).

Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 may store one or more of the databases.

Workstations 56, 62, 68, 74 and 42 may be connected not only to the WAN, but also to a telephone line, ISDN, cable, and/or wireless network that provides a secure connection to the machine being monitored, diagnosed and/or controlled and is used during communication. Additionally, if one communication medium is not operating properly, one of the others can be automatically used for communication.

A feature of the present invention is the use of a "store-and-forward" mode of communication (e.g., Internet electronic mail) or transmission between a machine and a computer for diagnosing and controlling the machine. Alternatively, the message may be transmitted using a mode of communication that makes direct, end-to-end connections (e.g., using a socket connection to the ultimate destination) such as FTP and HTTP.

Figure 2:
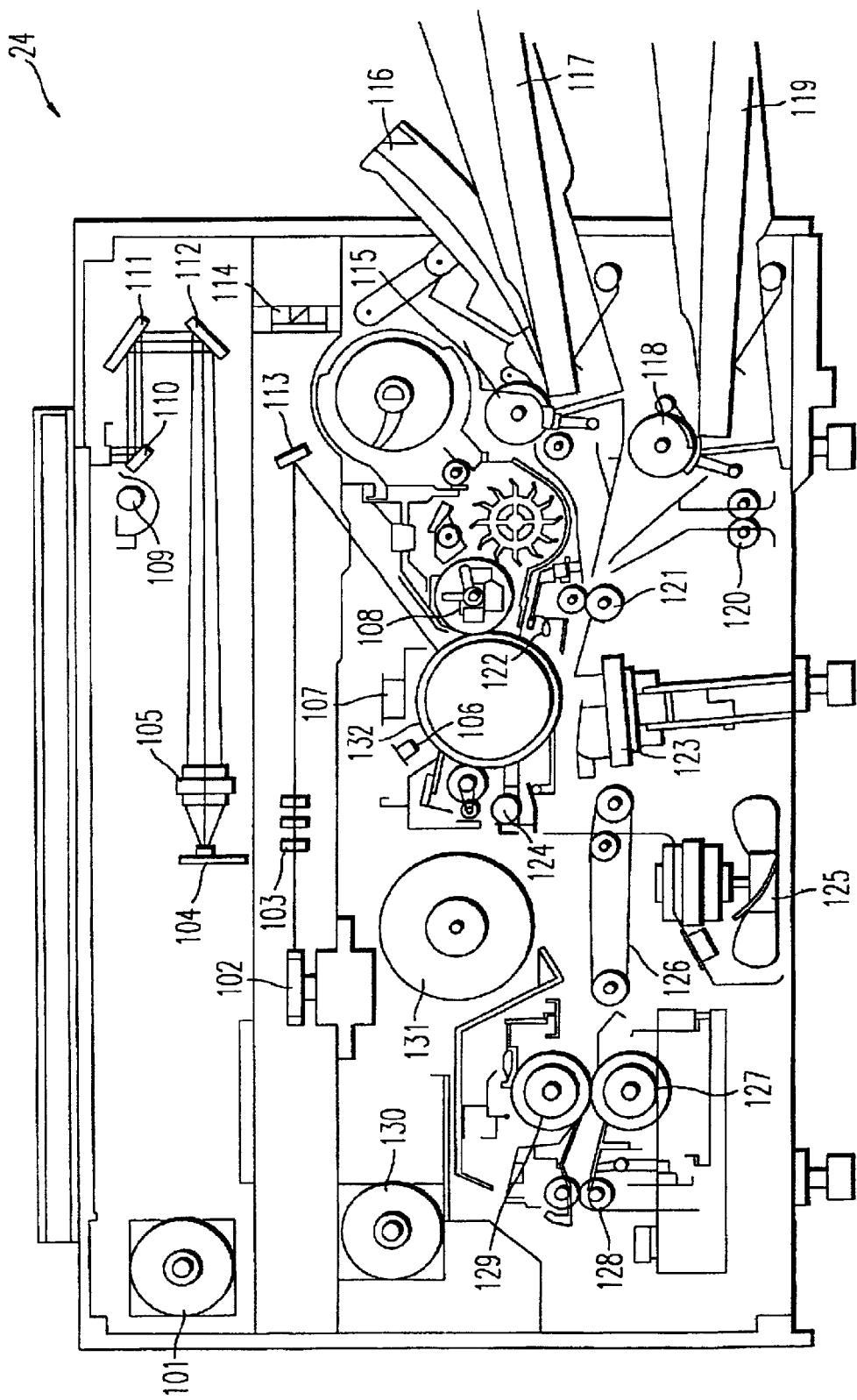
FIG. 2 illustrates the components of a digital image forming apparatus.

FIG. 2 illustrates the mechanical layout of an exemplary digital image forming apparatus 24 (FIG. 1). In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner. 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned, and 110, 111 and 112 designate mirrors used to reflect light onto the sensor 104.

A drum mirror 113 reflects light to the photoconductive drum 132 originating from the polygon mirror 102. Reference numeral 114 designates a fan used to cool the charging area of the digital image forming apparatus. A first paper feed roller 115 feeds paper from the first paper cassette 117, and 116 is a manual feed table. Similarly, 118 is a second paper feed roller for the second cassette 119. Reference numeral 120 designates a relay roller, and 121 is a registration roller. 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan, and 131 is the main motor used to drive the digital image forming apparatus.

Figure 3:
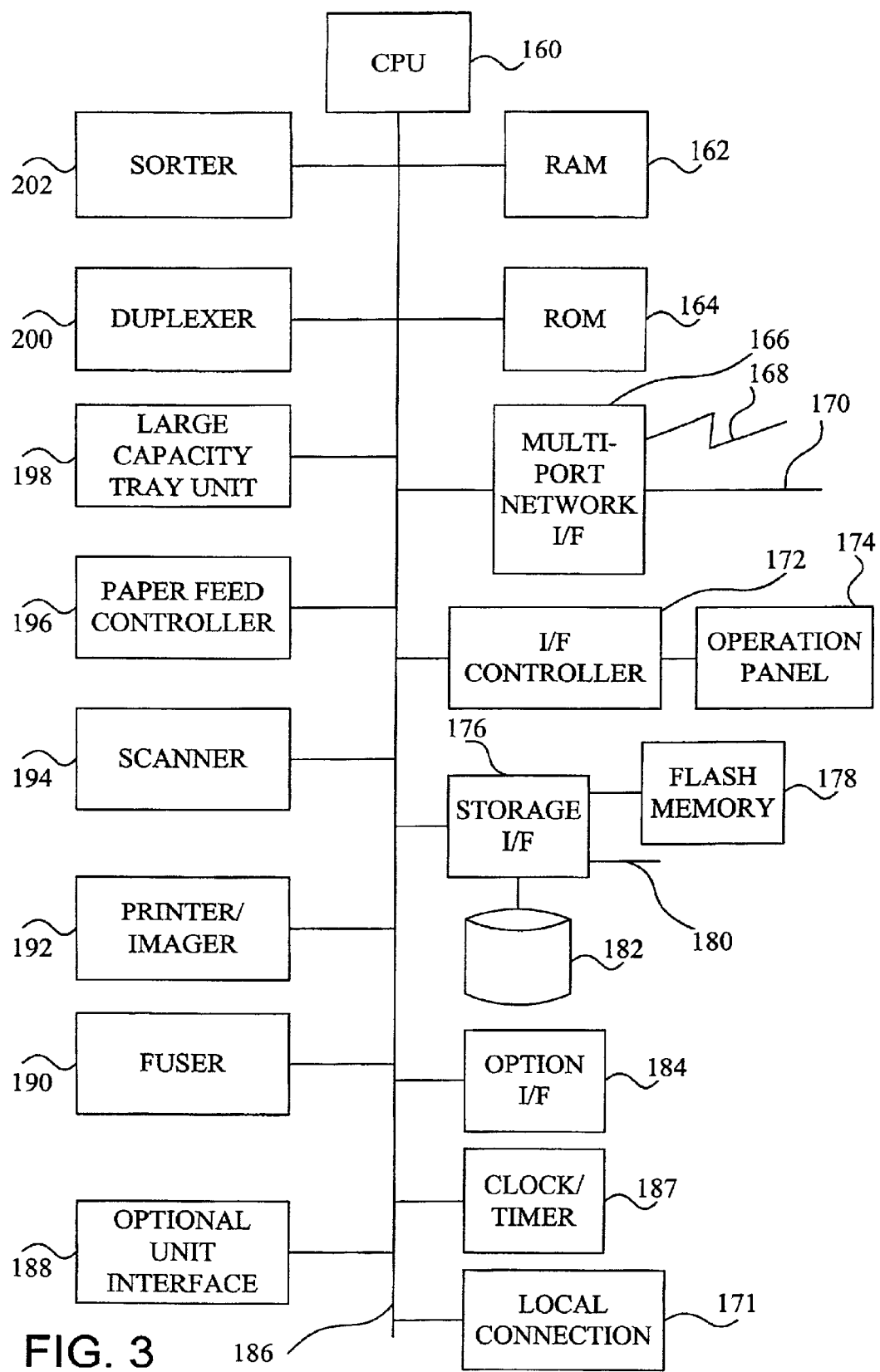
FIG. 3 illustrates the electronic components of the digital image forming apparatus illustrated in FIG. 2.

FIG. 3 illustrates a block diagram of electronic components that may be used to illustrate certain elements illustrated in FIG. 2. CPU 160 may be a microprocessor and acts as a system controller. Random access memory (RAM) 162 stores dynamically changing information including operating parameters of the digital image forming apparatus. A nonvolatile memory (e.g., a read only memory (ROM) 164 or a Flash Memory) stores the program code used to run the digital image forming apparatus, as well as static-state data describing the copier (e.g., model number, serial number, and default parameters).

A multi-port network interface 166 allows the digital image forming apparatus to communicate with external devices through at least one network. Reference number 168 represents a telephone, ISDN, or cable line, and numeral 170 represents another type of network. Additional details of the multi-port network interface 166 are described with respect to FIG. 4.

An interface (I/F) controller 172 is used to connect an operation panel 174 to a system bus 186. The operation panel 174 includes standard input and output devices found on a digital image forming apparatus including a copy button, keys to control the operation of the copier such as number of copies, reduction/enlargement, darkness/lightness, etc. Additionally, a liquid crystal display may be included in operation panel 174 to display parameters and messages of the digital image forming apparatus to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19–25, the contents of which are incorporated herein by reference. Preferably, communication utilizes a "reliable" protocol—one with error detection and retransmission.

A storage interface 176 connects storage devices to system bus 186. The storage devices may include a flash memory 178 that can be substituted by a conventional EEPROM, and a disk 182. The disk 182 may include one or more of a hard disk, optical disk, and/or a floppy disk drive. A connection 180 to the storage interface 176 allows for additional memory devices to be connected to the digital image forming apparatus. The flash memory 178 is used to store semi-static state data that describes parameters of the digital image forming apparatus that change infrequently over the life of the copier. Such parameters include the options and configuration of the digital image forming apparatus.

An option interface 184 allows additional hardware such as an external interface to be connected to the digital image forming apparatus. A clock/timer 187 is utilized to keep track of both the time and date, and may also measure elapsed time.

On the left side of FIG. 3, various sections making up the digital image forming device are illustrated. Reference numeral 202 designates a sorter, and contains sensors and actuators used to sort the output of the digital image forming device. There is a duplexer 200 that allows a duplex operation to be performed by the digital image forming device, and includes conventional sensors and actuators. A large capacity tray unit 198 allows paper trays holding a large number of sheets to be used, and includes conventional sensors and actuators.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used, including a home position sensor to determine that the scanner is in the home position, and a lamp thermistor to ensure proper operation of the scanning lamp.

A printer/imager 192 prints the output of the digital image forming device and includes a conventional laser printing mechanism, a toner sensor, and an image density sensor. A fuser 190 is used to fuse the toner onto the page using a high temperature roller, and includes an exit sensor, a thermistor to assure that the fuser 190 is not overheating, and an oil sensor.

Additionally, an optional unit interface 188 connects to optional elements of the digital image forming device, such as an automatic document feeder, a different type of sorter/collator, or other elements that can be added to the digital image forming device.

Figure 4:
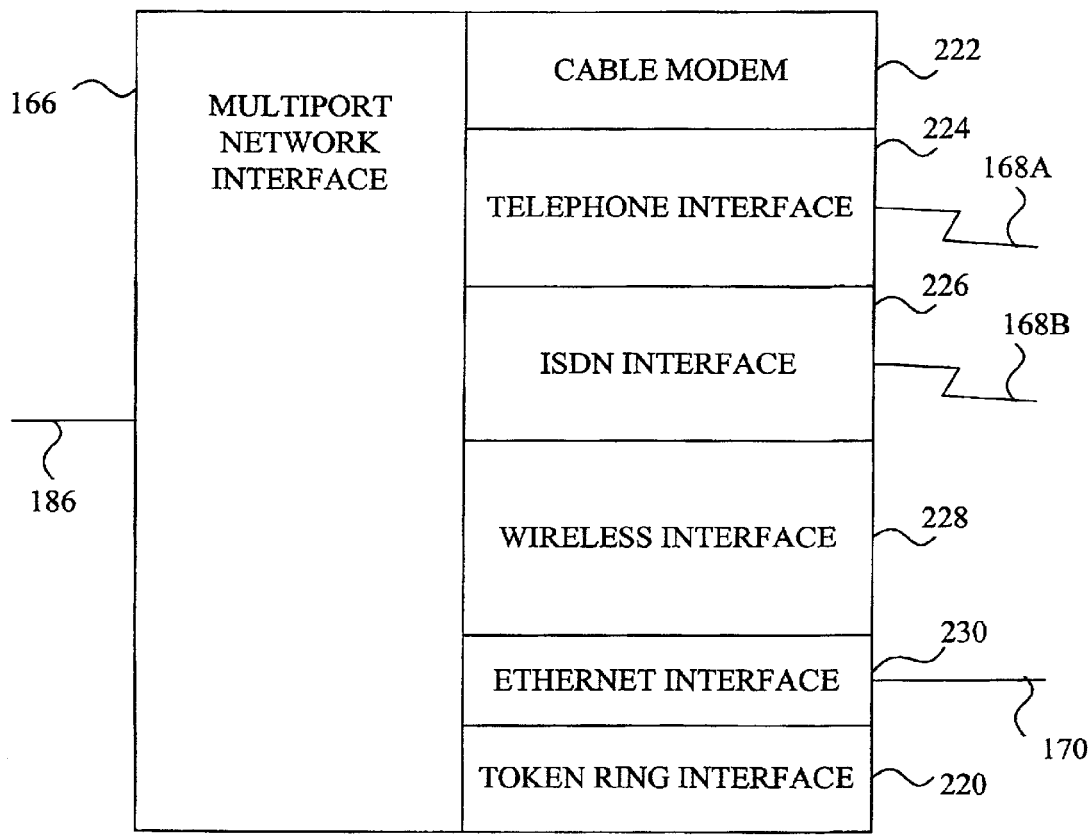
FIG. 4 illustrates details of a multi-port communication interface illustrated in FIG. 3.

FIG. 4 illustrates details of an exemplary multi-port network interface 166 (FIG. 3). The digital image forming device may communicate to external devices through a Token Ring interface 220, a cable modem unit 222 that has a high speed connection over cable, a conventional telephone interface 224 that connects to a telephone line 168A, an ISDN interface 226 that connects to an ISDN line 168B, a wireless interface 228, and an Ethernet interface 230 that connects to a LAN 170.

Other interfaces (not shown) include, but are not limited to, Digital Subscriber Line (DSL) (including original DSL, concentric DSL, and asymmetric DSL). A single device that connects to both a Local Area Network and a telephone line is commercially available from Megahertz and is known as the Ethernet-Modem.

The CPU 160 or other microprocessor or circuitry executes a monitoring process to monitor the state of each of the sensors of the digital image forming device, and a sequencing process is used to execute coded instructions to control and operate the digital image forming device. Additionally, a central system control process controls overall operation of the digital image forming device, and a communication process assures reliable communication to external devices connected to the digital image forming device.

The system control process monitors and controls data storage in a static state memory (e.g., ROM 164 of FIG. 3), a semi-static memory (e.g., flash memory 178 or disk 182), or a dynamic state memory (e.g., a volatile or non-volatile memory (e.g., the RAM 162 or the flash memory 178 or disk 182)). Additionally, the static state memory may be a device other than ROM 164, such as a non-volatile memory including either a flash memory 178 or a disk 182.

The above details have been described with respect to a digital image forming device, but the present invention is equally applicable to other business office machines or devices such as an analog copier, a facsimile machine, a scanner, a printer, a facsimile server, or other business office machines and business office appliance, or appliances (e.g., a microwave oven, VCR, digital camera, cellular phone, palm top computer).

Additionally, the present invention may be practiced with other types of devices that operate using store-and-forward or direct connection-based communication. Such devices include metering systems (including gas, water, or electricity metering systems), vending machines, or any mechanical devices (e.g., automobiles) that need to be monitored during operation or remotely diagnosed In addition to monitoring special purpose machines and computers, the invention can be used to monitor, control, and diagnose a general purpose computer that would constitute the monitored and/or controlled device.

Figure 5:
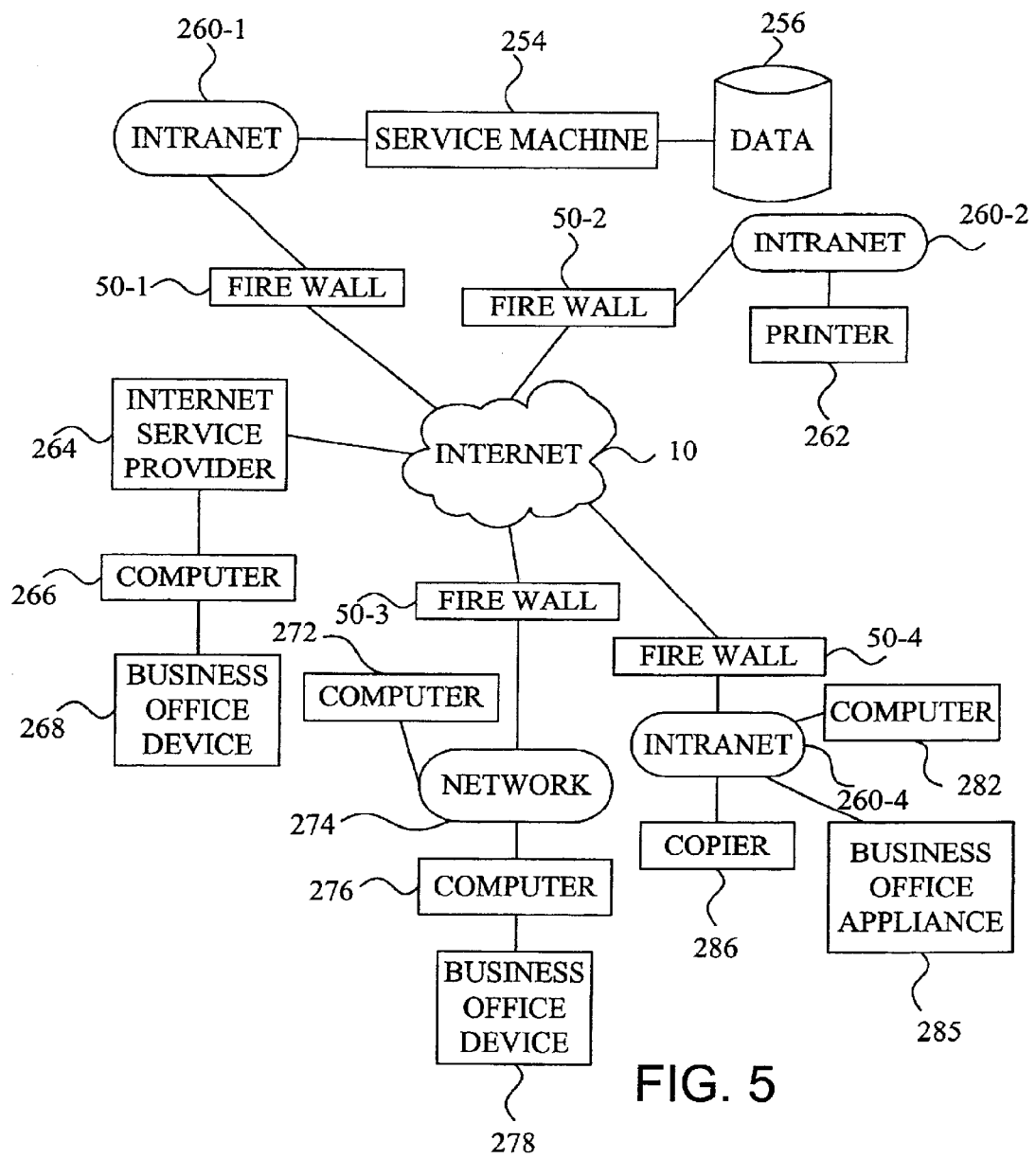
FIG. 5 illustrates an alternative system configuration in which business office devices are either connected directly to the network or connected to a computer that is connected to the network.

FIG. 5 illustrates a system diagram of an alternative embodiment of the invention, in which different devices and subsystems are connected to the WAN 10 which may be the Internet. However, there is no requirement to have all of these devices or subsystems as part of the invention, although each individual component or subsystem may be employed as part of the embodiment of the invention. Further, the elements illustrated in FIG. 1 may be connected to the WAN 10 which is illustrated in FIG. 5.

In FIG. 5, a firewall 50-1 is connected to an intranet 260-1. A service machine 254 connected to the intranet 260-1 includes therein or has connected thereto data 256 which may be stored in a database format. Data 256 may include history, performance, malfunction, and any other information including statistical information of the operation or failure or set-up and components or optional equipment of devices that are monitored. Service machine 254 may be implemented as the device or computer that requests the monitored devices to transmit data, or that requests that remote control and/or diagnostic tests be performed on the monitored devices. Service machine 254 may be implemented as any type of device, and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by circuitry, by a microprocessor, or by any other type of hardware contained within or mounted to the printer 262 (i.e., without using a separate general purpose computer).

An alternate type of sub-system includes the use of an internet service provider (ISP) 264, that may be, for example, as America Online, Earthlink, and Niftyserve. In this sub-system, a computer 266 is connected to the ISP 264 through a digital or analog modem (e.g., a telephone line modem, a cable modem, modems that use any type of wires such as modems used over an ISDN (Integrated Services Digital Network) line, ADSL (Asymmetric Digital Subscriber Line), modems that use frame relay communication, wireless modems such as a radio frequency modem, a fiber optic modem, or a device that uses infrared light waves). Further, a business office device 268 is connected to the computer 266.

As an alternative to the business office device 268 and to any other device illustrated in FIG. 5, a different type of machine may be monitored or controlled, such as a digital copier, any type of appliance, security system, or utility meter such as an electrical, water, or gas utility meter, or any other device discussed herein.

Also illustrated in FIG. 5 is a firewall 50-3 connected to a network 274. Network 274 may be implemented as any type of computer network, (e.g., an Ethernet or token-ring network). Networking software that may be used to control the network includes any desired networking software including software commercially available from Novell or Microsoft. The network 274 may be implemented as an Intranet, if desired.

A computer 272 connected to network 274 may be used to obtain information from a business office device 278 and generate reports such as reports showing problems that occurred in various machines connected to the network and a monthly usage report of the devices connected to the network 274. In this embodiment, a computer 276 is connected between the business office device 278 and the network 274. This computer receives communications from the network and forwards the appropriate commands or data, or any other information, to the business office device 278. Communication between business office device 278 and computer 276 may be accomplished using wire-based or wireless methods including, but not limited to, radio frequency connections, electrical connections and light connections (e.g., infrared or fiber optics connection).

Similarly, each of the various networks and intranets illustrated in FIG. 5 may be established in any desired manner, including wireless networks such as radio frequency networks. The wireless communication described herein may be established using spread spectrum techniques including techniques that use a spreading code and frequency hopping techniques such as the frequency hopping wireless technique disclosed in Bluetooth Specification 1.0 A (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5.

While FIG. 5 illustrates a plurality of firewalls, the firewalls are preferable but optional equipment, and therefore the invention, may be operated without the use of firewalls if desired.

Figure 6A:
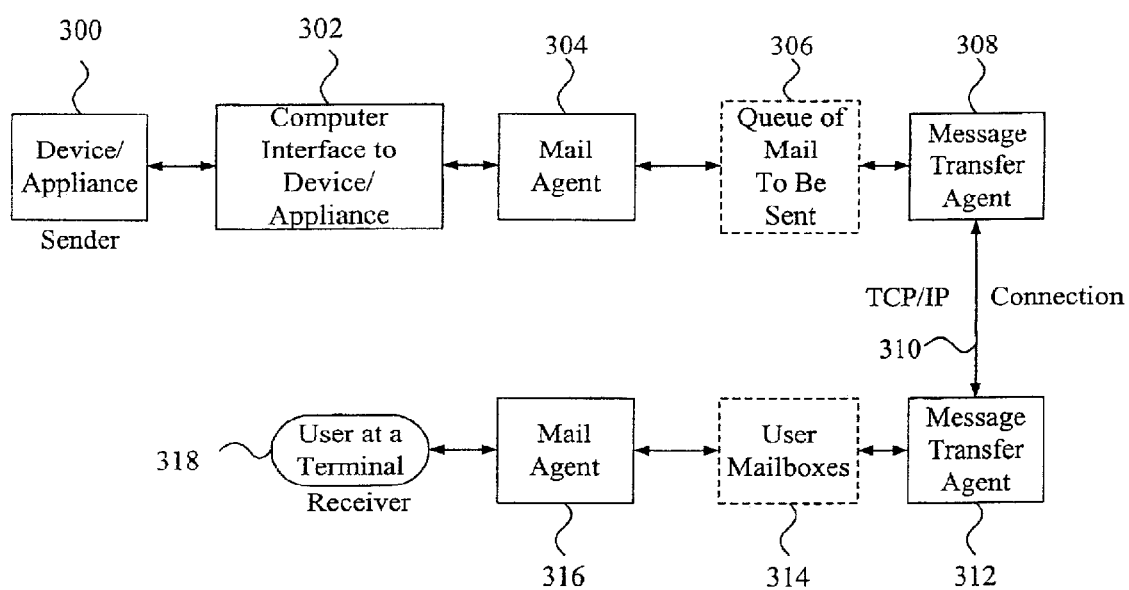
FIG. 6A is a block diagram illustrating a flow of information to and from an application unit using electronic mail.

FIG. 6A illustrates a device/appliance 300 connected to a typical e-mail exchange system that includes components 302, 304, 306, 308, 310, 312, 314, 316, and 318 which may be implemented in a conventional manner and are adapted from FIG. 28.1 of Stevens, above. A computer interface 302 interfaces with any of the application units or devices/appliances 300 described herein.

While FIG. 6A illustrates that the device/appliance 300 is the sender, the sending and receiving functions may be reversed in FIG. 6A. Furthermore, if desired, the user may not need to interface with the device/appliance 300 at all. The computer interface 302 then interacts with a mail agent 304. Popular mail agents for Unix include MH, Berkeley Mail, Elm, and Mush Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306.

The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, message transfer agents 308 and 312 may utilize any communication protocol. In one embodiment of the present invention, elements 302 and 304 of FIG. 6A reside in the library to monitor the application unit's usage.

From message transfer agent 312, e-mail messages are stored in user mailboxes 314 that are transferred to the mail agent 316 and are ultimately transmitted to the user at a terminal 318 that functions as a receiving terminal.

This "store-and-forward" process relieves the sending mail agent 304 from having to wait to establish a direct connection with the mail recipient. Because of network delays, the communication could require a substantial amount of time during which the application would be unresponsive. Such unresponsiveness is generally unacceptable to users of the application unit. But by using e-mail as the store-and-forward process, retransmission attempts after failures occur automatically for a fixed period of time (e.g., three days).

In an alternate embodiment, the application can avoid waiting by passing communicating requests to one or more separate threads. Those threads can then control communication with the receiving terminal 318 while the application begins responding to the user interface again.

In yet another embodiment in which a user wishes to have communication completed before continuing, direct communication with the receiving terminal is used. Such direct communication can utilize any protocol not blocked by a firewall between the sending and receiving terminals. Examples of such protocols include File Transfer Protocol (FTP) and HyperText Transfer Protocol (HTTP).

Public WANs, such as the Internet, are generally not considered to be secure. Therefore, messages transmitted over the public WANs (and multi-company private WANs) should be encrypted to keep the messages confidential. Encryption mechanisms are known and commercially available that may be used with the present invention. For example, a C++ library function, crypt( ) is available from Sun Microsystems for use with the Unix operating system. Other encryption and decryption software packages are known and commercially available and may also be used with this invention. One such package is PGP Virtual Private Network (VPN) available from Network Associates. Other VPN software is available from Microsoft Corporation.

Figure 6B:
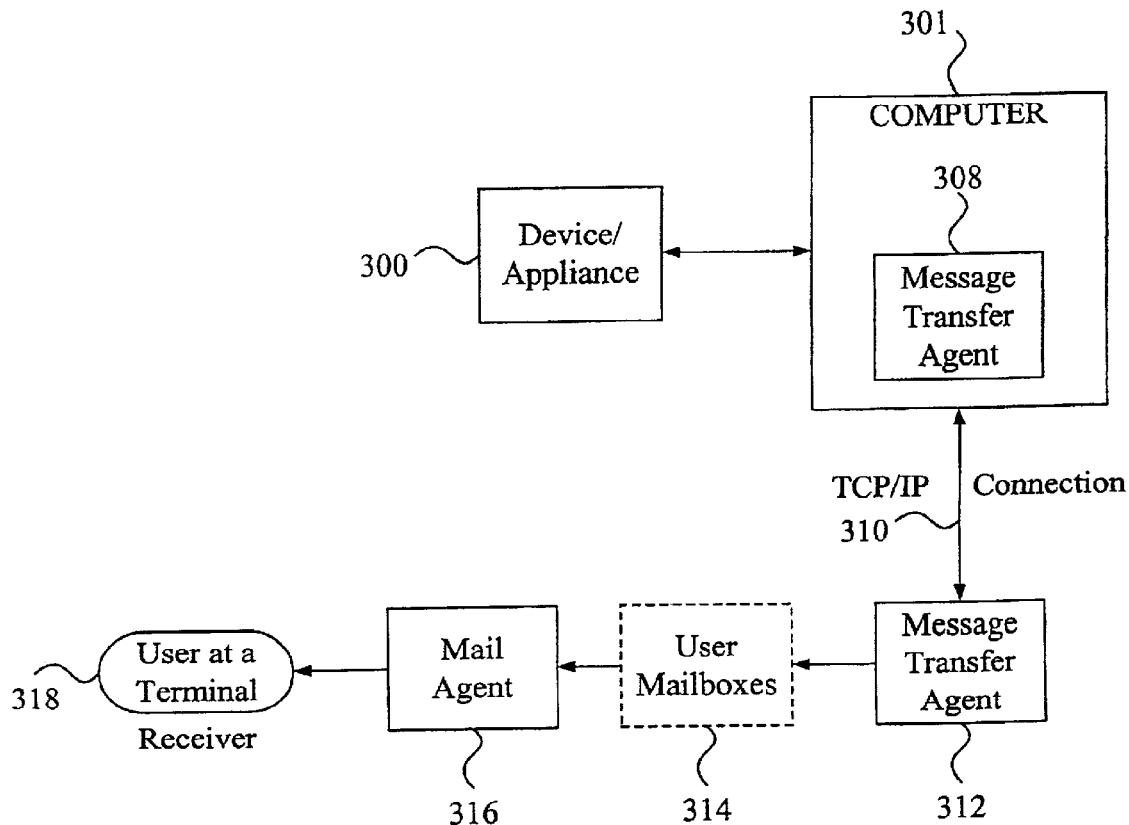
FIG. 6B illustrates an alternative way of communicating using electronic mail in which a computer that is connected to the application unit also serves as a message transfer agent.

As an alternative to the general structure of FIG. 6A, FIG. 6B shows a single computer 301 that functions as the computer interface 302, the mail agent 304, the mail queue 306 and the message transfer agent 308. As illustrated in FIG. 6B, device/appliance 300 is connected to a computer 301 which includes the message transfer agent 308.

Figure 6C:
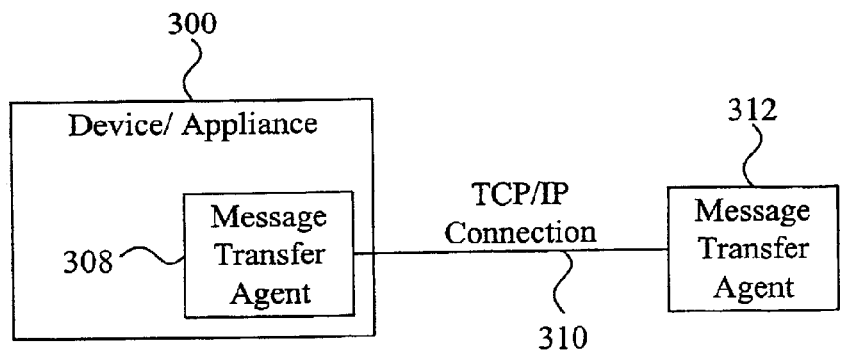
FIG. 6C illustrates an alternative way of communicating using electronic mail in which an application unit includes a message transfer agent for exchanging electronic mail.

A further alternative structure is shown in FIG. 6C, in which message transfer agent 308 is formed as part of the device/appliance 300. Further, message transfer agent 308 is connected to message transfer agent 312 by a TCP/IP connection 310. In the embodiment of FIG. 6C, device/appliance 300 is directly connected to the TCP/IP connection 310 and has e-mail capability. One use of the embodiment of FIG. 6C includes using a facsimile machine with an e-mail capability (e.g., as defined in RFC 2305 (a simple mode of facsimile using internet mail)) as the device/appliance 300.

Figure 6D:
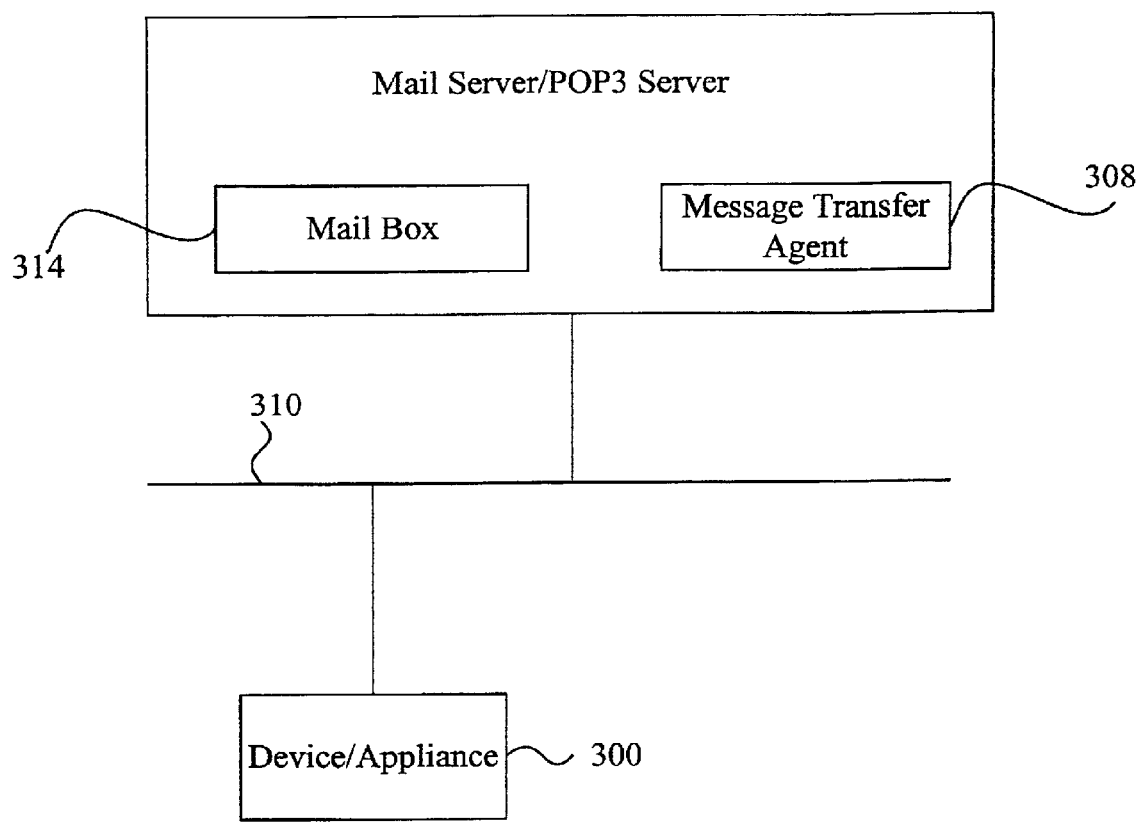
FIG. 6D illustrates an alternative way of communicating using electronic mail in which a mail server acts as a POP 3 server to receive mail for an appliance/device and as an SMTP server to send mail for the appliance/device.

FIG. 6D illustrates still another alternative system in which a device/appliance 300 does not itself have the capability to directly receive e-mail, but has a connection 310 to a mail sever/POP3 server. The mail server/POP3 serves includes a message transfer agent 308 and a mail box 314 so that the device/appliance 300 uses the POP3 protocol to retrieve mail from the mail server.

Figure 7:
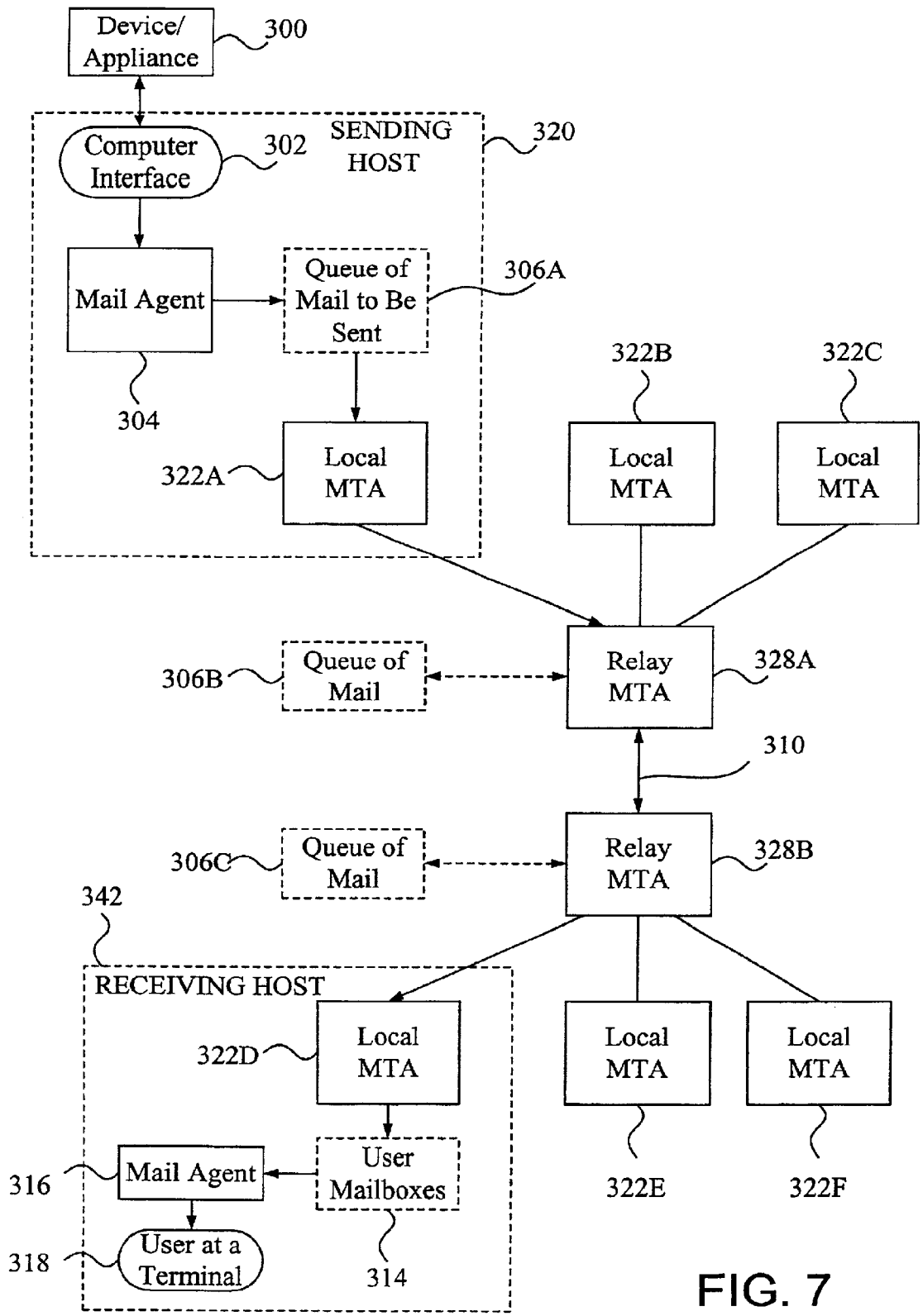
FIG. 7 illustrates an alternative manner of sending messages across the Internet.

FIG. 7 illustrates an alternative implementation of transferring mail and is adapted from FIG. 28.3 of Stevens, referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316, including local MTA 322A, relay MTAs 328A, 328B, and local MTA 322D. The most common protocol used for mail messages is SMTP (Simple Mail Transfer Protocol) which may be used with this invention, although any desired mail protocol may be utilized.

In FIG. 7, sending host 320 includes a computer interface 302, mail agent 304, and local MTA 322A. The device/appliance 300 is connected to, or alternatively included within, sending host 320. As another case, the device/appliance 300 and host 320 can be in one machine where the host capability is built into the device/appliance 300. Other local MTAs 322B, 322C, 322E and 322F may also be included. Mail to be transmitted and received may be queued in a mail queue 306B of relay MTA 328A. The messages are transferred across the TCP/IP connection 310 (e.g., an Internet connection or a connection across any other type of network).

The transmitted messages are received by the relay MTA 328B and if desired, stored in a mail queue 306C. The mail is then forwarded to the local MTA 322D of a receiving host 342. The mail may be placed in one or more user mailboxes 314, subsequently forwarded to the mail agent 316, and finally forwarded to the user at a terminal 318. If desired, the mail may be directly forwarded to the terminal without user interaction.

Figure 8:
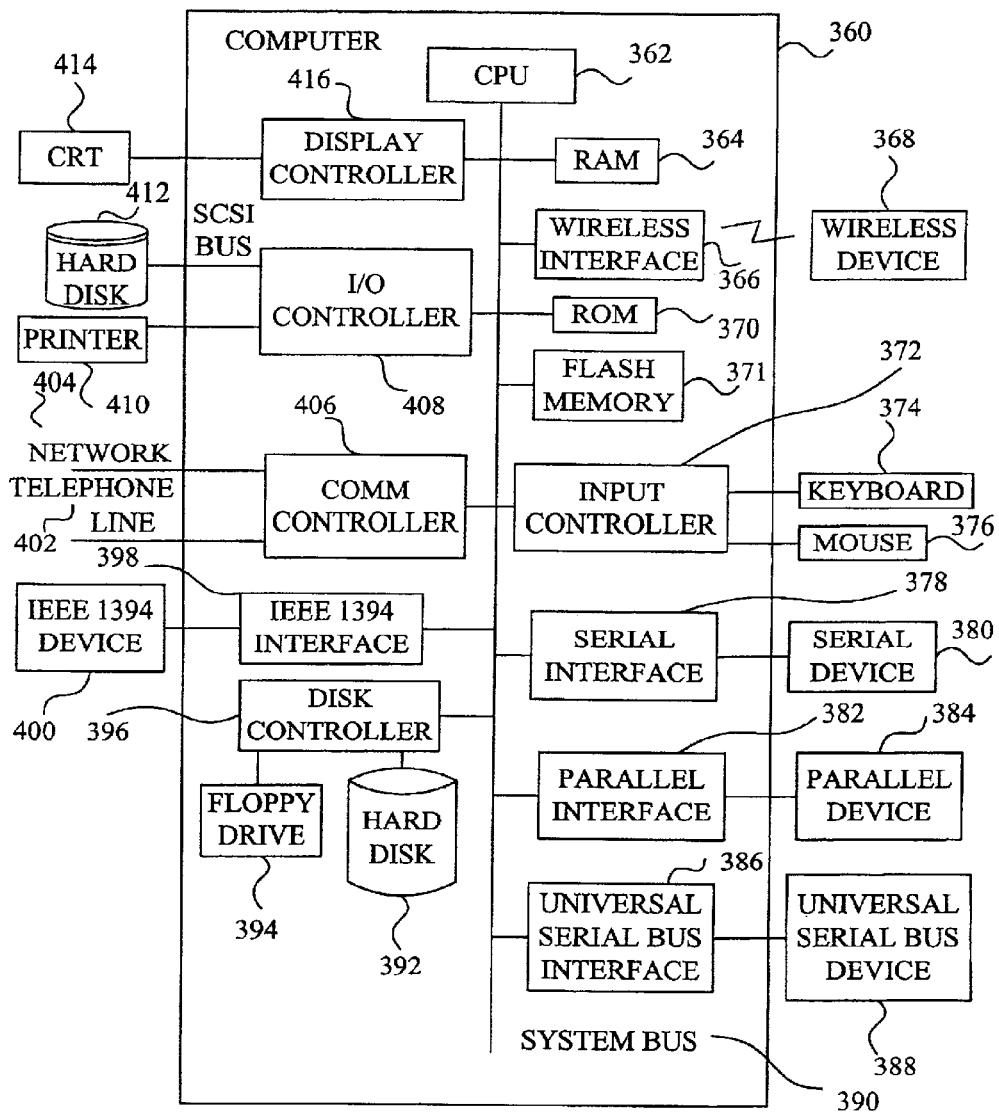
FIG. 8 illustrates an exemplary computer that may be connected to an appliance/device and used to communicate electronic mail messages.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, computer 360 includes a CPU 362 that may be implemented as any type of processor including commercially available microprocessors from companies such as Intel, AMD, Motorola, Hitachi and NEC. There is a working memory such as a RAM 364, and a wireless interface 366 that communicates with a wireless device 368. Communication between interface 366 and device 368 may use any wireless medium (e.g., radio waves or light waves). The radio waves may be implemented using a spread spectrum technique such as Code Division Multiple Access (CDMA) communication, or using a frequency hopping technique such as that disclosed in the Bluetooth specification.

There is a ROM 370 and a flash memory 371, although any other type of non-volatile memory (e.g., EPROM, or an EEPROM) may be utilized in addition to or in place of the flash memory 371. An input controller 372 has connected thereto a keyboard 374 and a mouse 376. There is a serial interface 378 connected to a serial device 380.

Additionally, a parallel interface 382 is connected to a parallel device 384, a universal serial bus (USB) interface 386 is connected to a universal serial bus device 388. An IEEE 1394 device 400, commonly referred to as a fire wire device, is connected to an IEEE 1394 interface 398.

The various elements of the computer 360 are connected by a system bus 390. A disk controller 396 is connected to a floppy disk drive 394 and a hard disk drive 392. A communication controller 406 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
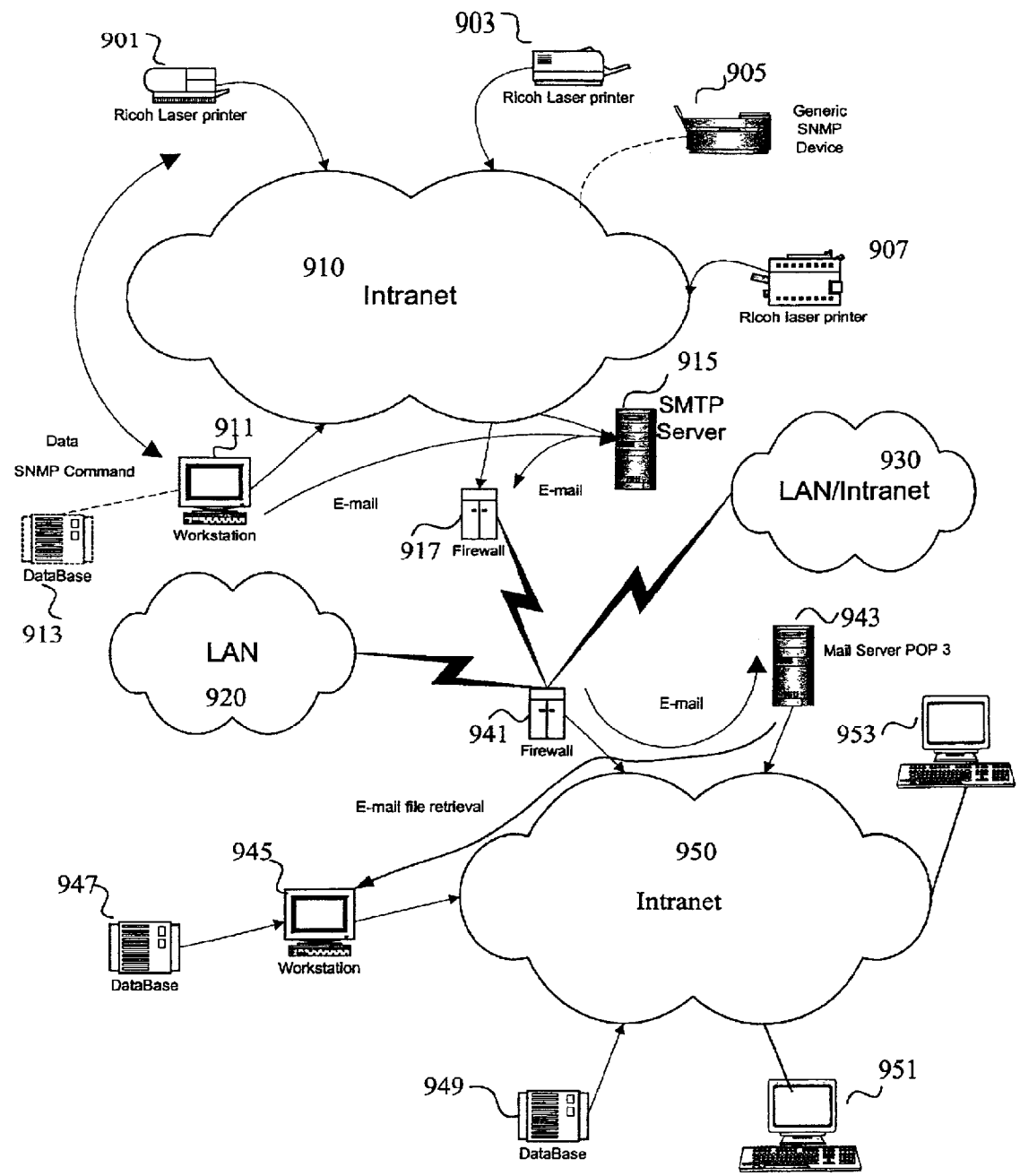
FIG. 9 is an overall system configuration related to the present invention.

FIG. 9 illustrates an application of the present invention. Devices 901, 903, 905 and 907 that are connected to an Intranet 910 are the devices to be monitored locally by workstation 911 with its database 913. Alternatively, workstation 911 can send device status information to a monitoring workstation 945 by polling the information from the monitored devices 901, 903, 905, and 907 and then sending the information through a firewall 917. Workstation 911, therefore, can function either as a monitoring device or as a communication and administrative device between the monitored devices and monitoring device.

In FIG. 9, workstation 911 preferably uses SNMP defined by IETF to communicate with the attached devices. SNMP is described in "Managing Internetworks with SNMP, third edition" by Mark A. Miller, P. E., M & T Book, 1999. The contents of this reference are incorporated herein by reference. If some of the devices do not support SNMP, workstation 911 can use different methods to obtain the necessary information. After obtaining the necessary information, workstation 911 uses SMTP server 915 to send out the necessary information to the monitoring workstation 945 through the mail server 943 that supports Post Office Protocol Version 3 (POP 3) (IETF Networking Group Request For Comments [RFC]: 1939).

Workstation 911 preferably uses Simple Mail Transfer Protocol (SMTP defined in IETF RFC 821) and possibly MIME to send e-mails. Workstation 911 generates the mail message that is at and above the Application Layer of the TCP/IP model or ISO seven-layer model as shown later. Alternatively, workstation 911 may contain SMTP processor to send out the necessary information using e-mail.

Similarly, the LAN 920 and Intranet 930 are sending similar information to monitoring workstation 945. When the e-mails that contain the monitoring information of devices arrive at firewall 941 of the intranet 950, the mail is routed to the mail server 943 with POP 3. Workstation 945 periodically accesses the mail server 943 to obtain the received e-mail via POP3, parse the e-mail and its content, and stores the necessary information in the database 947. Database 949 contains the additional information of the monitored device characteristics and history.

Computers 951 and 953 perform the analysis of obtained data to take the necessary actions. Alternatively, workstation 945 may contain email receiving capability and the firewall may route the e-mail directly to the workstation 945.

Figure 10:
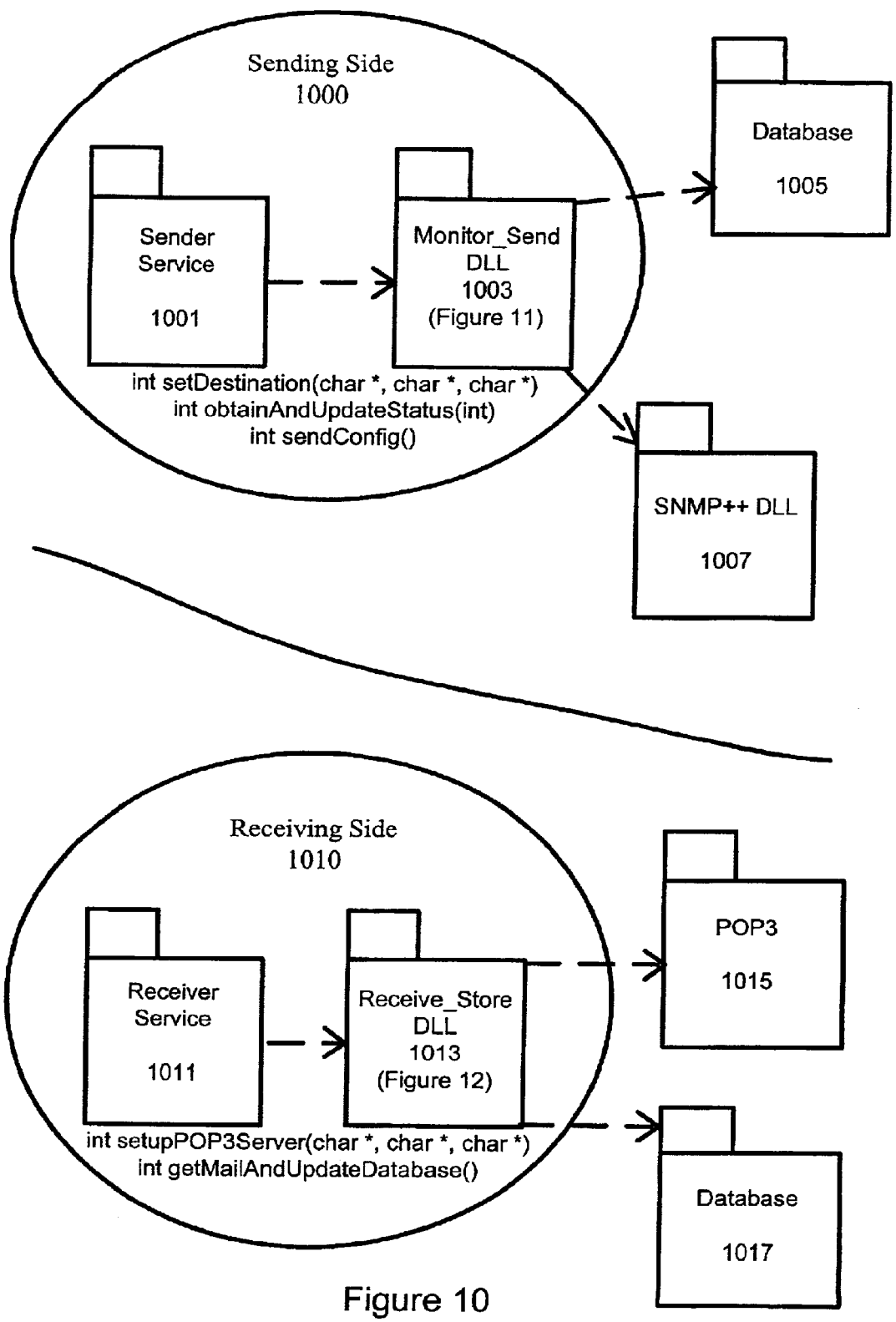
FIG. 10 illustrates a general software architecture of sending and receiving modules, FIGS. 11 and 12 respectively illustrate general architectures of the Monitor_Send DLL module 1003 and Receive_Store DLL module 1013 (both of FIG. 10)

FIG. 10 illustrates an overall architecture of the exemplary system shown in FIG. 9. The upper portion 1000 of FIG. 10 corresponds to networks that send e-mails with the information on the monitored devices in FIG. 9, while the lower portion 1010 of FIG. 10 shows the receiving side (intranet 950) in FIG. 9.

Sender service 1001 is the system resident software that sets up the destination for the monitored information to be sent, initiates the sending of the configuration and contact information to the destination, and periodically monitors and sends the status information to the destination by using the three functions defined in 1000 to trigger the Monitor_Send DLL 1003.

Monitor_Send DLL 1003 uses two other modules, database 1005 to store the device information and device related information along with the monitored information that needs to be stored between sending out, and SNMP++ DLL 1007 that is used to obtain the information from the devices via SNMP.

Receiver Service 1011 is the system resident software that sets up access to the mail server where the monitored information is sent to, and periodically obtains the monitored information from the mail server by using the two functions defined in 1010 to trigger the Receive_Store DLL 1013. Receive_Store DLL 1013 uses two other modules: database 1017 to store device information and device related information along with the monitored information, and POP3 1015 that is used to retrieve the information from the mail server.

Figure 11:
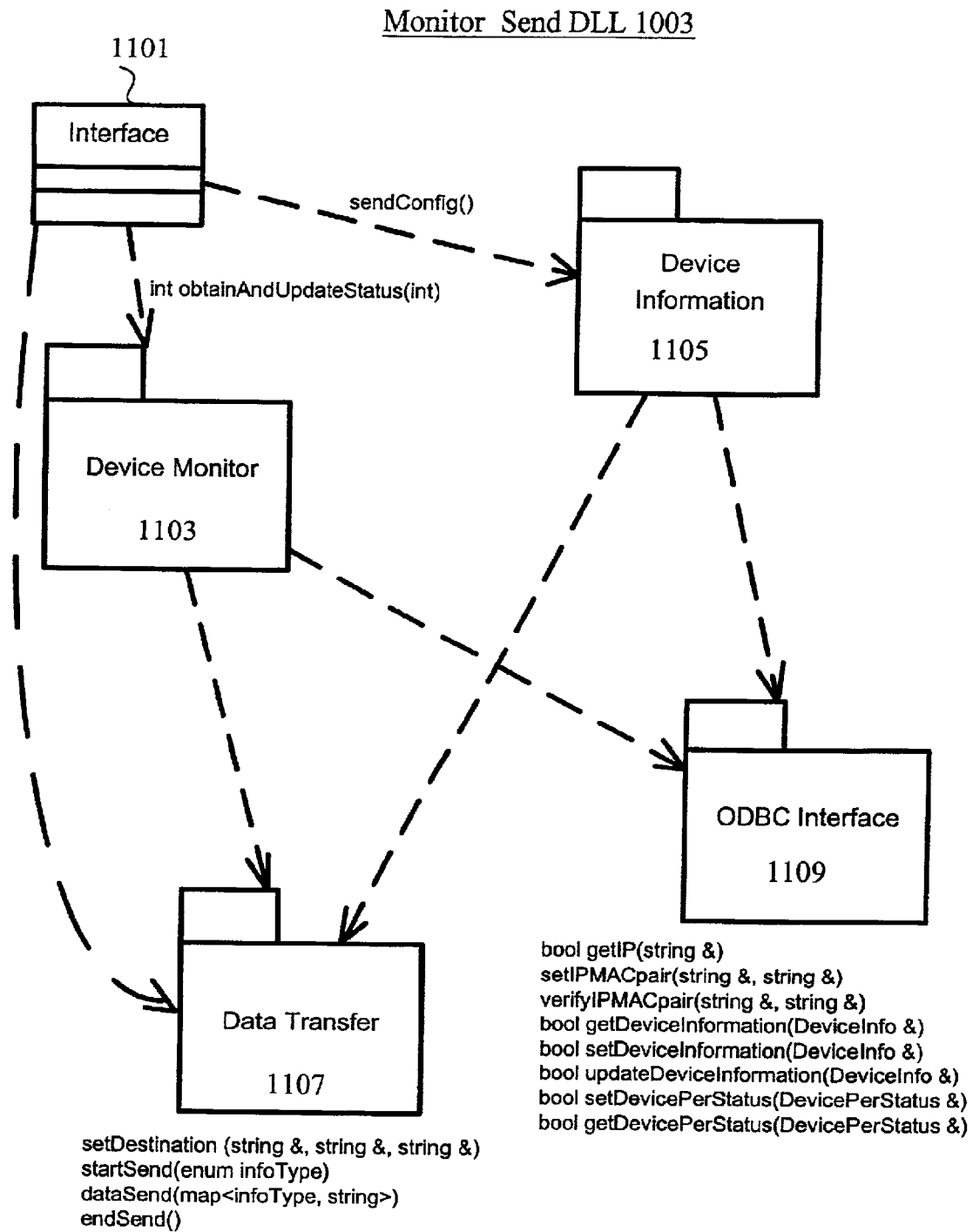

FIG. 11 illustrates an example of general architecture of Monitor_Send DLL 1003 (FIG. 10). This part of the system is responsible for monitoring the status of the devices and for sending the e-mails with the information on the monitored devices. An interface 1101 allows any application to use the Monitor_Send DLL. For example, the Sender Service 1001 in FIG. 10 uses interface 1101 to use Monitor_Send DLL.

Device Information 1105 is responsible for obtaining configuration information of the monitored devices, and initiating the sending of the information. Device Monitor 1103 is also responsible for obtaining information about the status of the monitored device and initiating the sending of the information.

Data Transfer 1107 is responsible for sending information, and an ODBC (Open DataBase Connectivity) Interface 1109 is responsible for accessing and storing information in a database.

Each of the components of the Monitor_Send DLL include interface functions that allow them to perform its tasks.

Figure 12:
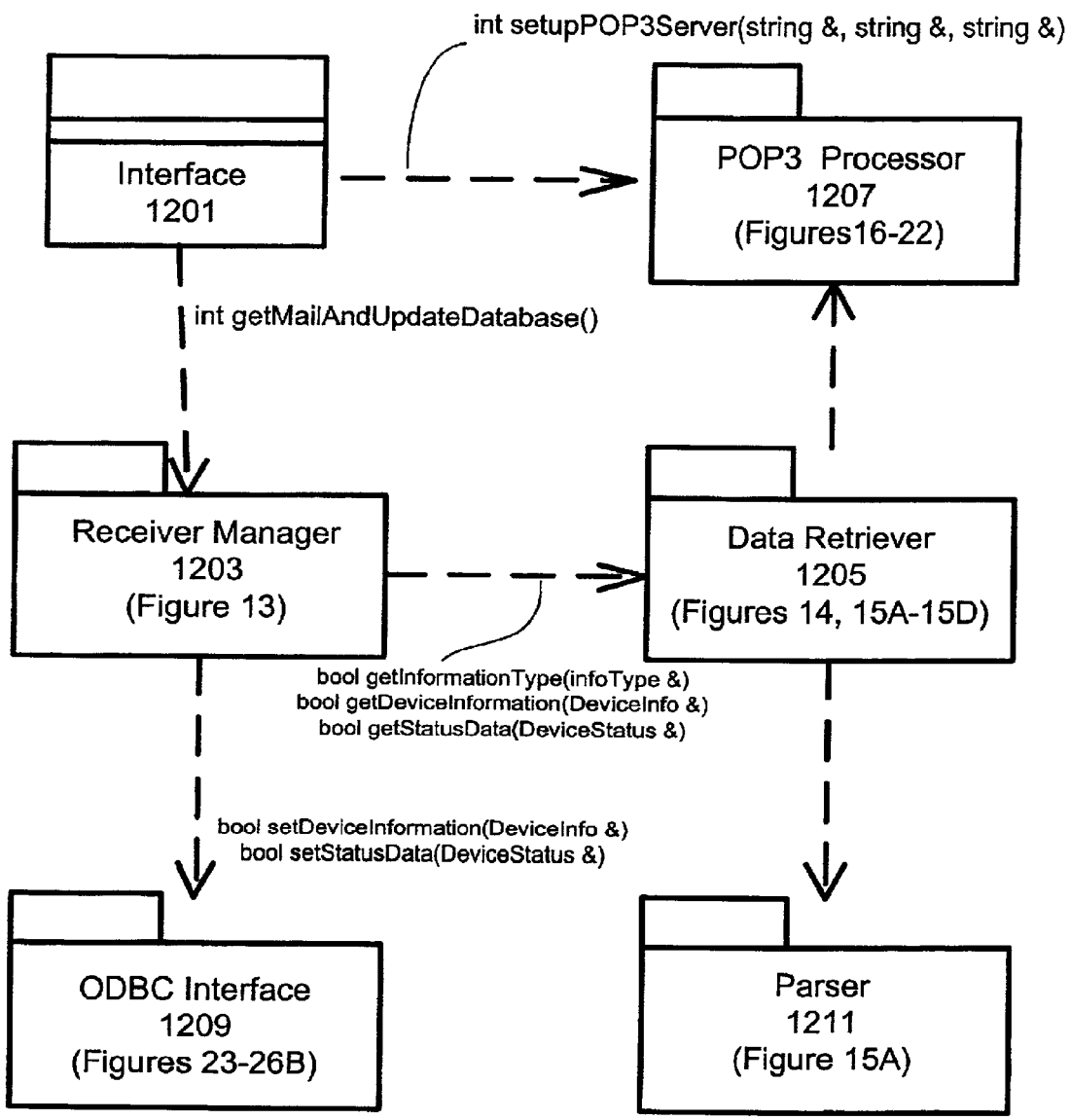

FIG. 12 illustrates an exemplary architecture of the Receive_Store DLL 1013 (FIG. 10), which is responsible for retrieving information that was sent to it by the Monitor_Send DLL 1003 (FIGS. 10 and 11) and storing the information in the database. The architecture includes six components:

Interface 1201 allows any application to use the Receive_Store DLL. For example, Receiver Service 1011 in FIG. 10 uses Interface 1201 to use the Receive_Store DLL.

Receive Manager 1203 is responsible for obtaining configuration information and status information of the monitored devices from the POP3 server, and for storing the information in the database.

Data Retriever 1205 is responsible for retrieving the data from the POP3 server.

POP3 Processor 1207 is responsible for accessing the information sent to it by the Monitor_Send DLL 1003 (FIG. 11).

Parser 1211 is responsible for parsing the information obtained from the POP3 server.

Finally, ODBC Interface 1209 is responsible for storing the information sent to it.

Each of the components of the Receive_Store DLL 1013 provides interface functions that allow them to perform their tasks.

Figure 13:
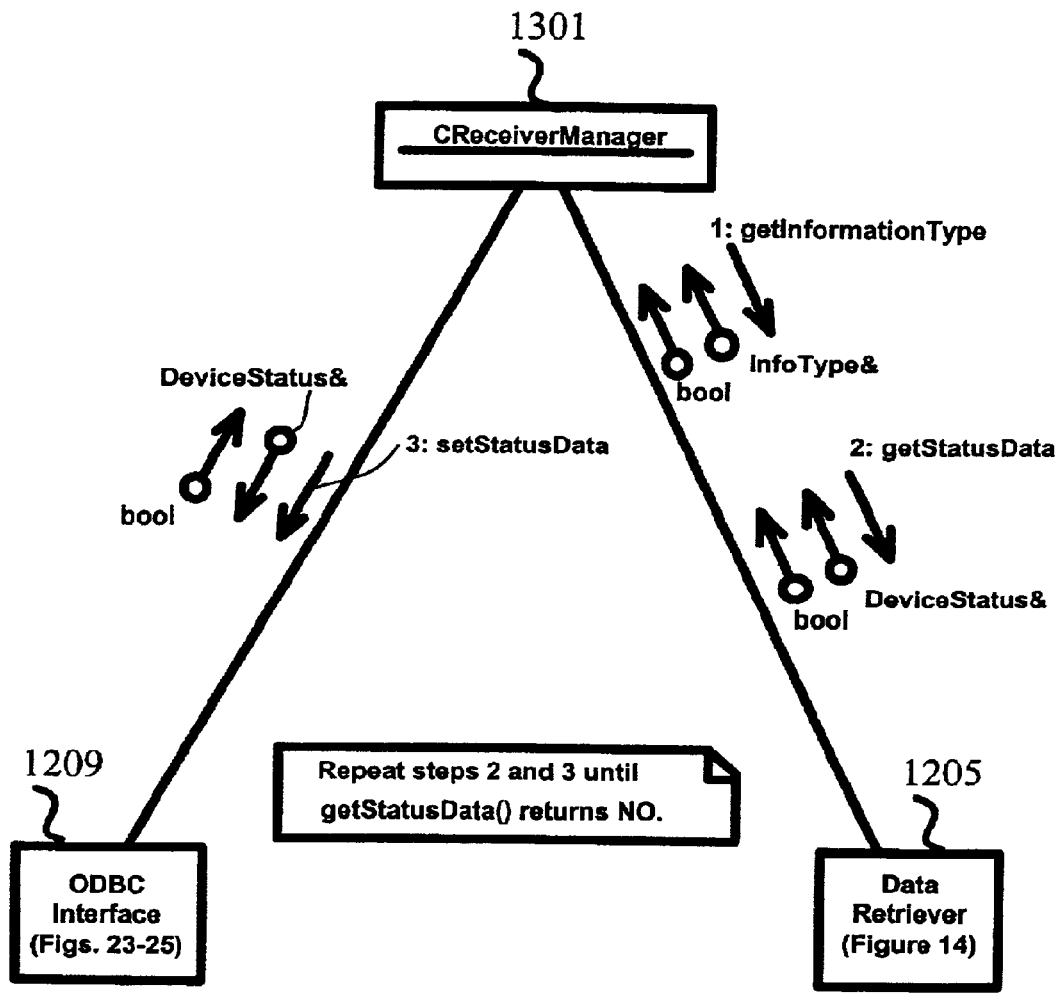
FIG. 13 illustrates a collaboration diagram within the Receiver Manager module 1203 (FIG. 12)

FIG. 13 illustrates how an object in Receiver Manager 1203 interacts with Data Retriever 1205 and ODBC Interface 1209 (all previously discussed with reference to FIG. 12). Receiver Manager 1203 is responsible for retrieving the device information and status information about the network devices from the received email messages, and for storing the information into the database. Receiver Manager 1203 includes a single class, CReceiverManager 1301, that performs various functions:

CReceiverManager 1301 calls getInformationType( ) of Data Retriever 1205 to determine the type of information, whether configuration information or status information, of the monitored devices, that was obtained from the mail server. Based upon the obtained type, CReceiverManager calls different functions of Data Retriever 1205 with respective data structures.

CReceiverManager 1301 calls getStatusData( ) of Data Retriever 1205 to obtain the status information of the monitored devices by passing by reference, the DeviceStatus data structure.

Then, CReceiverManager 1301 calls setStatusData( ) of ODBC Interface 1209 to store the status information in the database by passing the obtained reference to the DeviceStatus data structure.

The configuration information of the monitored devices are obtained and stored in a similar manner, except that the DeviceInfo data structure is used instead of the DeviceStatus data structure:

CReceiverManager 1301 calls getDeviceInformation( ) function of Data Retriever 1205 to obtain the Device Configuration Information by passing by reference, the DeviceInfo data structure, as shown in FIG. 12.

CReceiverManager 1301 then calls setDeviceInformation( ) function of ODBC Interface 1209 to store Device Information in the database by passing the obtained reference to the DeviceInfo data structure.

To further describe FIG. 13 in a more sequential operational manner: CReceiverManager 1301 passes a data structure into Data Retriever 1205 (detailed in FIGS. 14, 15B and 15D) to obtain status information from the email message. Then, CReceiverManager 1301 passes the data structure into the ODBC Interface 1209 (detailed in FIGS. 23, 24 and 26A) to store the status information in the database. After CReceiverManager 1301 determines that the information type in the email message is status information by calling the function getInformationType( ) of Data Retriever 1205, CReceiverManager 1301 calls the getStatusData( ) function in Data Retriever 1205 to retrieve the status information from the email message. As the status information is extracted from the email message by the Data Retriever 1205 one line at a time, the status information is stored in the DeviceStatus data structure (FIG. 23 element 2313) that was passed into the getStatusData( ) function After all the status information is extracted from the email message for a monitored device and stored in the DeviceStatus data structure 2313, CReceiverManager 1301 calls the setStatusData( ) function of ODBC Interface 1209 to store the status information in a database. CReceiverManager 1301 passes the DeviceStatus data structure 2313 into ODBC Interface through this setStatusData( ) function, and the status information stored in the DeviceStatus structure 2313 is copied into the database.

A reference to the DeviceStatus structure 2313 is passed into Data Retriever 1205 and into ODBC Interface 1209 so that the same structure is used by the Data Retriever and the ODBC Interface. Thus, there is no copying of the DeviceStatus data structure 2313 itself as it is passed into Data Retriever 1205 or ODBC Interface 1209. By passing a reference to the DeviceStatus structure 2313 into the getStatusData( ) function of Data Retriever 1205, the status information is directly stored in the DeviceStatus structure passed into this getStatusData( ) function. After completing the execution of the getStatusData( ) function of Data Retriever 1205, the contents of the DeviceStatus structure 2313 contain the status information extracted from the email message.

The foregoing implementation involves passing data structures, DeviceInfo and DeviceStatus, by reference, rather than passing them by value. A description of passing by reference and passing by value into a function is provided in Addison Wesley's *The C++ Programming Language, Special Edition* by Bjarne Stroustrup, on pages 145–147, which is incorporated herein by reference.

If, hypothetically, the DeviceStatus structure 2313 was passed into the getstatusData( ) function of Data Retriever 1205 by value, rather than by reference, a copy of the DeviceStatus structure 2313 would be used by getStatusData( ). After completing the execution of the getStatusData( ) function of Data Retriever 1205, the copy of the DeviceStatus structure 2313 would contain the status information extracted from the email message. However, disadvantageously, the DeviceStatus structure 2313 that was passed in, would not contain the status information extracted from the email. Therefore, CReceiverManager 1301 must pass the DeviceStatus structure by reference into the getStatusData( ) function of Data Retriever 1205 in order to obtain the status information from the email message.

When the getStatusData( ) function of Data Retriever 1205 is completed, the DeviceStatus structure 2313 that was passed by reference contains status information from the email message. Stated another way, when the getStatusData( ) function returns from execution, the DeviceStatus structure 2313 is returned with the status information from the email message.

In a manner similar to that described above, for status information, configuration information is extracted from the email message by Data Retriever and stored in the data structure DeviceInfo. The configuration information is stored in the database by copying the information from the DeviceInfo structure into the database.

The process carried out by Receiver Manager 1203 (FIGS. 12, 13) is now described in more detail.

Figure 14:
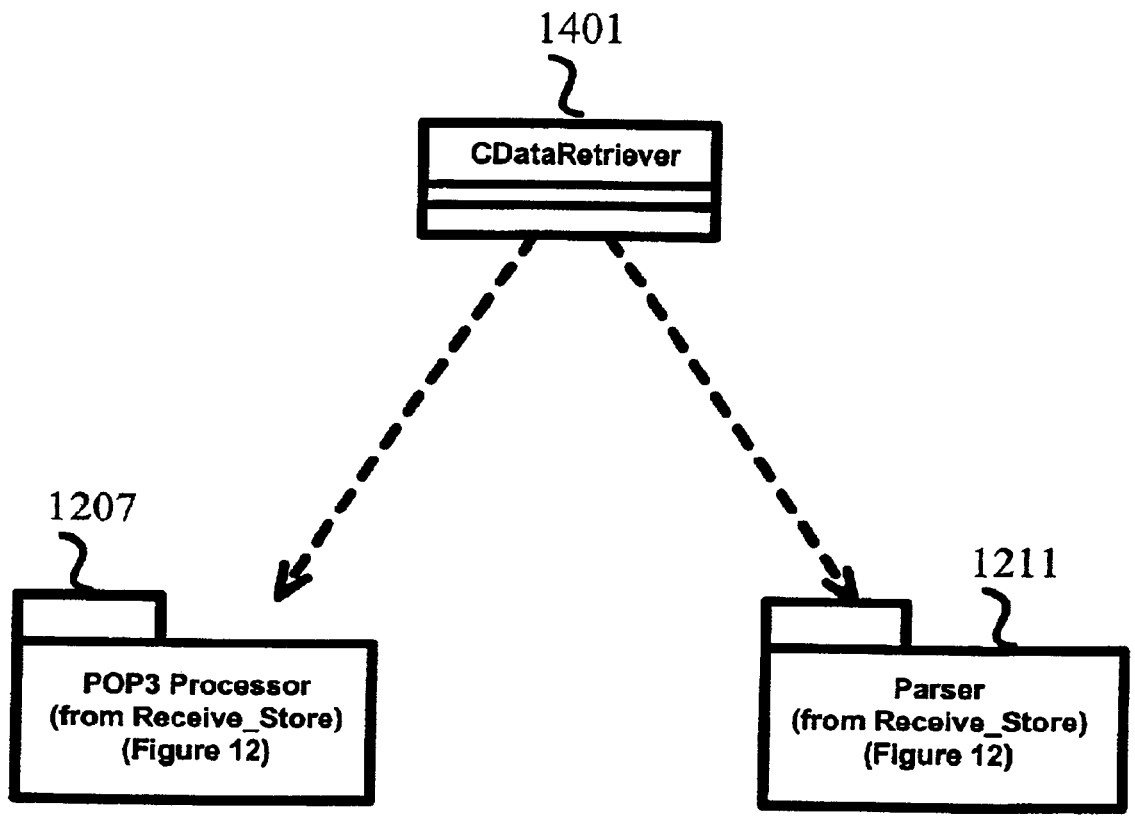
FIG. 14 illustrates a class structure of the Data Retriever module 1205 (FIG. 12)

FIG. 14 illustrates an exemplary class diagram of Data Retriever 1205. Data Retriever 1205 is responsible for determining the type of information in an email message and for obtaining the device information and status information from the email message. Data Retriever 1205 contains one class, CDataRetriever 1401.

CDataRetriever 1401 is responsible for retrieving the configuration information or status information from the POP3 server. CDataRetriever 1401 uses POP3 Processor 1207 to obtain the message from the POP3 server. CDataRetriever 1401 uses Parser 1211 to parse the message to obtain the configuration information or status information.

Figure 15A:
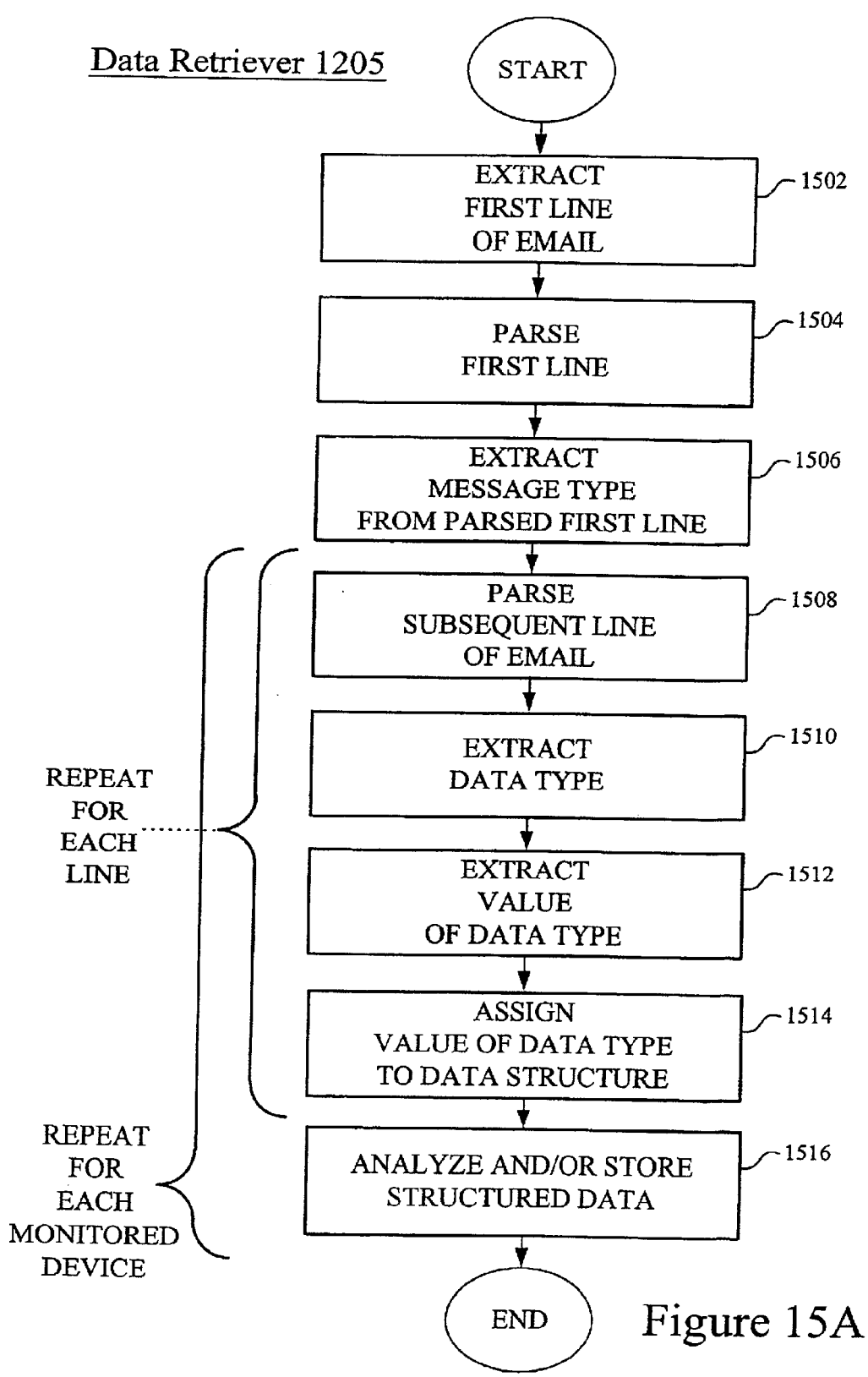
FIG. 15A is a flowchart showing a method within the Data Retriever module 1205 for extracting message-type-dependent data and insertion of the data into a data structure.

FIG. 15A is a flowchart showing how information about a remotely monitored device is extracted according to message type and data structure. The message types may designate, for example, device configuration information as distinguished from device status information. The data structure varies according to message type, and may even be different for different messages having the same message type. The flowchart of FIG. 15A may be implemented, for example, using an object-oriented approach using the classes of FIG. 14 and the collaboration diagram of FIG. 15B.

It is assumed that an email message containing the information has been received by, for example, a firewall 941 (FIG. 9). The email message may have travelled from a device 901, 903, 905, 907, via any of a variety of paths, including a firewall 917, LAN 920, LAN/Intranet 930, or the Internet After the email is received, the received email is assumed to have been routed to an email server such as a POP3 server. In FIG. 9, a POP3 server is illustrated as being in a dedicated computer 943, but it is understood that a monitoring workstation 945 or other processing device may itself include the email server to which the email may be directly routed. After the email server in computer 943 or other processing device has received the email that has been routed to it, monitoring workstation 945 or other suitable processing device extracts the portion of the email containing the information concerning the monitored device. This extraction may be, for example, the extraction of a MIME attachment, and may be performed by the same or a different processing device as the one in which the email server is resident.

Briefly, email messages may contain different types of information even if the format of the email messages is the same. A preferred embodiment involves extracting a data type from the email message, determining which data structure to use to store the information, extracting the information from the email message, storing the data in the data structure, and placing the data in the data structure into the database. In a preferred embodiment, the email message contains information about the data type that lets the system determine which type of data structure to use to store the data; the data structure itself is not defined in the email message as such, but the data structure is determined by the message type found in the email message.

The process of FIG. 15A proceeds as follows. The process begins with the step 1502 of extracting the first line from the portion of the email containing the configuration information or status information. In a particular embodiment, the first line is understood to contain the message type designation. Once extracted, the first line is parsed in step 1504 so as to isolate the message type designation. The message type designation may be, for example, configuration information, status information, and so forth. Once isolated, the message type designation is extracted from the parsed first line in step 1506. At this time, the processing device recognizes the message type that has been received.

Blocks 1508 through 1514 indicate functions that are preformed once for each line in the email message. If, as is the normal case, more than one line is present in an email message for a given device being monitored, blocks 1508 through 1514 constitute a loop.

The first loop 1508–1514 and block 1516 are executed once for each monitored device. Thus, if more than one monitored device is reported in the email message, then 1508–1516 constitute an outer loop that contains inner loop 1508–1514. The functions in these nested loops are discussed below, with reference to examples in TABLES ONE, TWO, FOUR, and FIVE.

Once the message type has been determined, the data structure used to subsequently store the information in the subsequent lines of the email is defined. In the example discussed below, if the message type is configuration information, the data structure defined to store the information is DeviceInfo as specified in TABLE FOUR. If the message type is status information, the data structure defined to store the information is DeviceStatus as specified in TABLE FIVE.

As lines subsequent to the first line are extracted (step 1508), the "type" of data (step 1510) and its value (step 1512) are extracted from the line and placed into the appropriate data structure, either DeviceInfo or DeviceStatus (step 1514). The subsequent lines do not define the data structure of the information.

The data structures are already defined once the message type is known. TABLE ONE and TABLE TWO show the lines of text in an email message containing configuration information and status information, respectively. This data does not represent or define the structure for the configuration information or status information, but constitutes the data that is stored in either the DeviceInfo structure or DeviceStatus structure.

Referring again to FIG. 15A, after the message type has been extracted from the first line, a subsequent line of the email (or portion thereof, such as a MIME attachment containing the relevant device configuration or status information) is parsed in step 1508.

Step 1510 involves extracting the type of configuration information or type of status information from the line (such as MACAddress for the configuration information or low-Paper for the status information, as shown in TABLE ONE and TABLE TWO, respectively). Once the data type has been determined, the value of the data type is extracted in step 1512 from the line (such as 00 00 aa 5e 1d fc for the MACAddress or 0 for the lowPaper as shown in TABLE ONE and TABLE TWO, respectively). Once the data type and value of the data type are extracted, the value of the data type can be assigned to the appropriate data structure in step 1514.

Steps 1508 through 1514 are repeated for each line of the email message until all the lines of data for the monitored device is extracted. A separator is encountered that separates the information for the different monitored devices. The separator indicates the end of information for the monitored device and beginning of information for the next monitored device.

Steps 1508 through 1516 are repeated for each monitored device in the email message until the entire email message is extracted. Since an email message may contain the configuration information or status information of more than one monitored device, the data is extracted and stored for each monitored device.

In the foregoing manner, an email message is received before the message type and the information it contains are known. This arrangement allows a wide variety of message types and information to be communicated in the same way, and be decomposed and analyzed at the receiving end. The decomposition at the receiving end allows the sending devices and the communication techniques to be chosen independently of the particular message type and information being communicated. Conversely, the flexibility of having the message type designation and information within the message allows these items to be changed without regard to the particular sending device or communication technique.

Though the present description refers to two types of information (status information and configuration information) received in the email message, the invention envisions that additional types of information can be incorporated in email messages. The Parser in the Receive_Store DLL in each case knows how to parse each information type, and a data structure appropriate to the information type is used to store the information in the database after the information is extracted from the email.

TABLE ONE shows an example of part of a message containing configuration information about a monitored device, before the message is encrypted and encoded (or after it has been decoded and decrypted). This part of the email message is extracted and parsed one line at a time to obtain the message type and the configuration information about the monitored device.

TABLE ONE

Example of Email Containing "Configuration Information"

DataType, DeviceInformation
&&&&&
MACAddress, 00 00 aa 5e 1d fc
dateTime, 2000:08:14:14:57:15
Manufacturer, Xerox
Model, DocuPrint N4025 Network Laser Printer
...
ContactPerson, Ricoh Joe
PhoneNumber, 800-555-1234
&&&&&
MACAddress, 08 00 11 0f a5 33
dateTime, 2000:08:14:14:57:15
Manufacturer, Tektronix Inc
Model, Phaser 750P
...
ContactPerson, Ricoh Joe
PhoneNumber, 800-555-1234

In TABLE ONE, the message type and configuration information come in type-value pairs. For example, the first line contains information about the message type. The type is "DataType" and the value is "DeviceInformation" (Configuration Information).

The "&&&&&" separates the configuration information of different devices. The message can contain configuration information for multiple devices. The "#####" ends the message for the configuration information.

For each device, there are multiple type-value pairs to represent the configuration information. For example, "Manufacturer, Xerox" represents the information about the manufacturer of the device. The type is "Manufacturer" and the value is "Xerox".

In the example of TABLE ONE, the type and value are represented as strings in the message. However, the type may also be represented by a numeric code in which a number represents a specific type of information. Whether the line of the message contains message type or configuration information, the line of message is extracted and parsed to obtain the type and value for the line. The value is stored in the appropriate data structure.

TABLE TWO shows an example of part of a message containing status information about a monitored device. Just as with the configuration information, the message type and status information are represented as type-value pairs on each line of the message. A line of the message is extracted and parsed to obtain the type and value for the line. The value is stored in the appropriate data structure.

TABLE TWO

Example of Email Containing "Status Information"

DataType, StatusInformation
&&&&&
MACAddress, 00 00 aa 5e 1d fc
dateTime, 2000:08:14:14:57:15
sysUpTime, 18987385
hrDeviceErrors, 0
hrPrinterStatus, 3
lowPaper, 0
noPaper, 0
lowToner, 0
noToner, 0
doorOpen, 0
jammed, 0
offline, 0
serviceRequested, 0
prtGeneralConfigChanges, 14
prtMarkerLifeCount, 1025
prtMarkerSuppliesLevel1, −3
&&&&&
MACAddress, 08 00 11 0f a5 33
dateTime, 2000:08:14:14:57:15
sysUpTime, 18119400
hrDeviceErrors, 0
hrPrinterStatus, 1
lowPaper, 0
noPaper, 0
lowToner, 0
noToner, 0
doorOpen, 0
jammed, 0
offline, 0
serviceRequested, 0
prtGeneralConfigChanges, 1
prtMarkerLifeCount, 202
prtMarkerSuppliesLevel1, 408594
prtMarkerSuppliesLevel2, 465760
prtMarkerSuppliesLevel3, 560748
prtMarkerSuppliesLevel4, 330950

Whether the information is configuration information or status information, the information can be stored in different data structures for the different message types. The appropriate data structure is used to store information provided in the message. After the message type is determined, the data structure is defined to store the subsequent lines of the message containing the information Parser 1211 is responsible for parsing each line of configuration information and status information, and obtaining the type-value pair. Then, Parser 1211 places the information into the data structure as described with reference to TABLE FOUR and TABLE FIVE. The Parser module contains only one class, CParser, that performs all the functions of the Parser module.

Figure 15B:
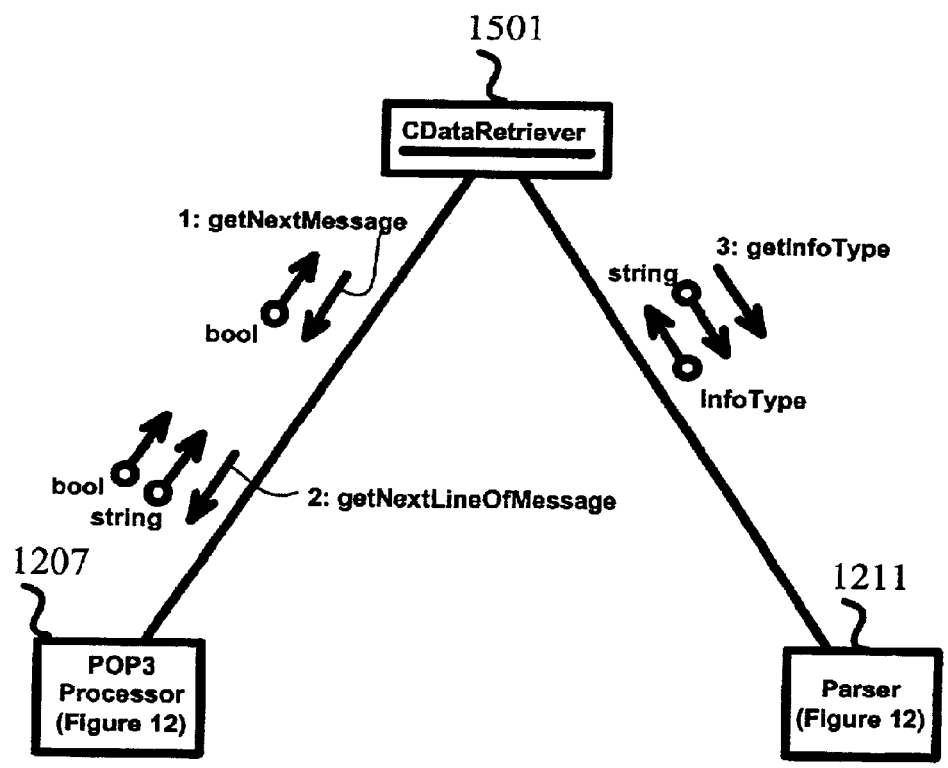
FIGS. 15B, 15C, and 15D illustrate collaboration diagrams within the Data Retriever module 1205.

FIG. 15B illustrates how the objects in FIG. 14 interact to retrieve from the POP3 server, the type of information in a received email. The objects distinguish configuration information from status information.

To perform the method of FIG. 15A, CDataRetriever 1501 performs the following calls:

CDataRetriever 1501 calls getNextMessage( ) of POP3 Processor 1207 (FIG. 12) to obtain the next message in the POP3 server.

Then, CDataRetriever 1501 calls getNextLineOfMessage( ) of POP3 Processor 1207 (FIG. 12) to obtain the first line of the message.

Finally, CDataRetriever 1501 calls getInfoType( ) of Parser 1211 (FIG. 12) to determine the type of information contained in the message by parsing the first line of the message.

Parser 1211 contains two public functions:
setdeviceInfo and
setDeviceStatus.

Both functions receive the string message line obtained from POP3 Processor 1207 and reference to the appropriate data structure (DeviceInfo or DeviceStatus). Parser 1211 parses the message line, and if it recognizes appropriate data for the data structure, it puts the recognized data into the data structure.

As discussed above, TABLE ONE and TABLE TWO provide examples of the lines of data from which the Parser class extracts information, such as data type, configuration information, and status information. FIG. 15B illustrates how CDataRetriever gets the first line of the email message from the POP3 Processor and passes the line to Parser to determine the message type. The function getInfoType( ) of Parser parses the first line of the email message to determine if it contains the message type.

If it contains the message type, then it determines which message type it is. TABLE ONE shows an example of an email message containing configuration information. The Parser determines from the first line, "DataType, DeviceInformation", that this message contains configuration information. TABLE TWO shows an example of an email message containing status information. The Parser determines from the first line, "DataType, StatusInformation", that this message contains status information.

Figure 15C:
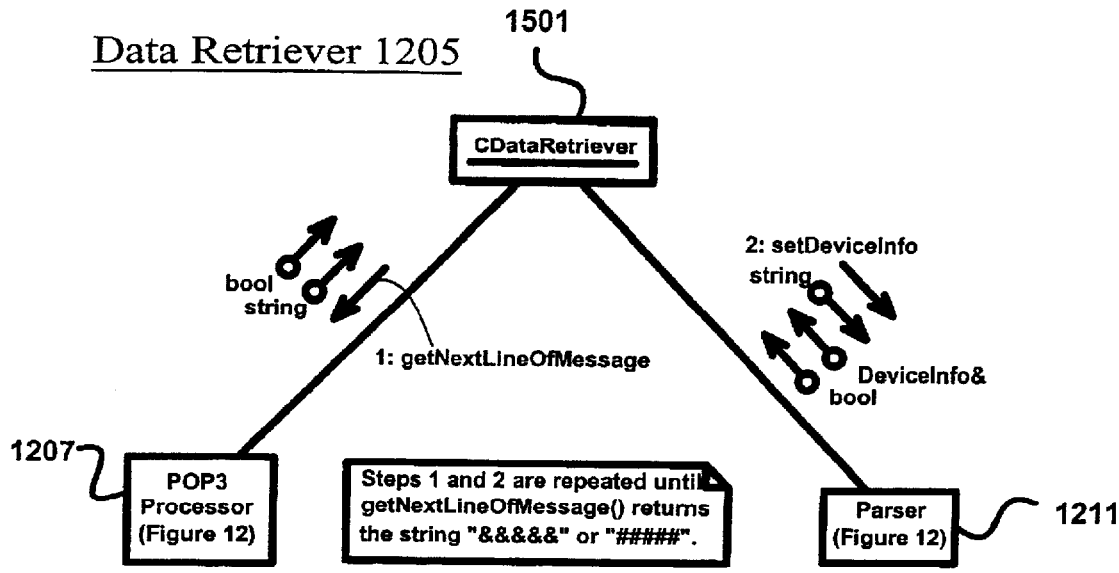
Figure 15D:
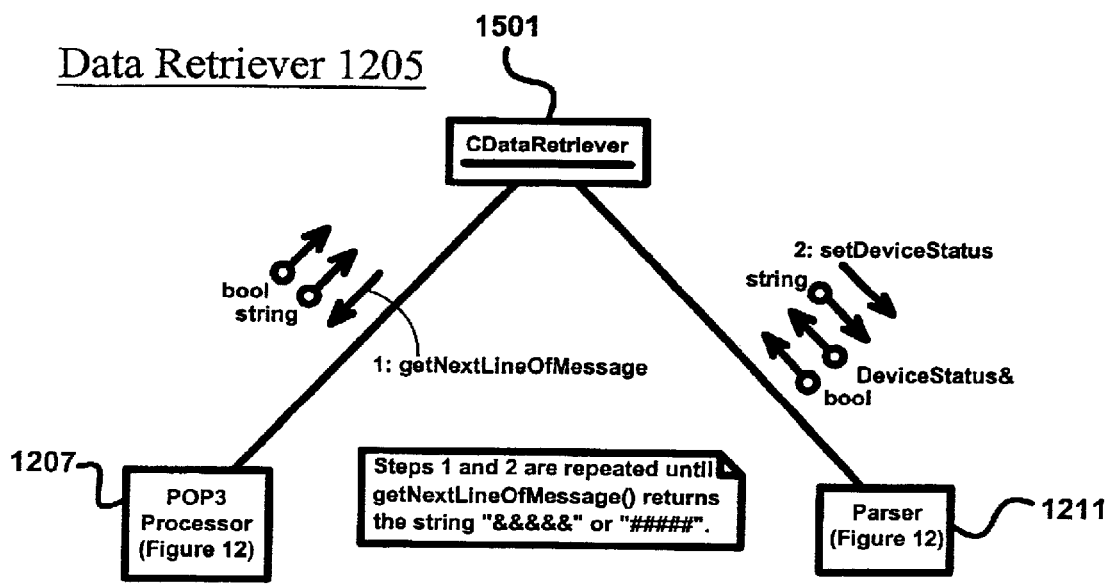

The collaboration diagrams of FIGS. 15C and 15D show how the configuration information and status information are obtained from the lines of the email message subsequent to the first line.

The collaboration diagram of FIG. 15C shows how the objects in FIG. 14 interact to retrieve the configuration information from the POP3 server. CDataRetriever calls getNextLineOfMessage( ) of POP3 Processor to obtain a line containing configuration information from the email message. The line is passed into Parser through the call setDeviceInfo( ) to parse the configuration information contained in the line.

The DeviceInfo structure in TABLE FOUR is also passed into Parser along with the line through the call setDeviceInfo( ) so that the configuration information in the line can be assigned to the structure. The Parser extracts the type of configuration and type from the line and assigns it to the DeviceInfo structure. CDataRetriever continues to call getNextLineOfMessage( ) of POP3 Processor and setDeviceInfo( ) of Parser until a line is returned indicating that the end of information for the device has been encountered.

As an example from TABLE ONE, when the line "MACAddress, 00 00 aa 5e 1d fc" is passed into setDeviceInfo( ) of Parser, the Parser determines the type of configuration to be the MAC address and its value to be "00 00 aa 5e 1d fc". This information is then placed into the DeviceInfo structure.

The collaboration diagram of FIG. 15D shows how the objects in FIG. 14 interact to retrieve status information from the POP3 server. CDataRetriever calls getNextLineOfMessage( ) of POP3 Processor to obtain a line containing status information from the email message. The line is passed into Parser through the call setDeviceStatus( ) to parse the status information contained in the line. The DeviceStatus structure as described in TABLE FIVE is also passed into Parser along with the line through the call setDeviceStatus( ) so that the status information in the line can be assigned to the structure.

Parser extracts the type of status and value of the type from the line and assigns it to the DeviceStatus structure. CDataRetriever continues to call getNextLineOfMessage( ) of POP3 Processor and setDeviceStatus( ) of Parser until a line is returned indicating that the end of information for the device has been encountered.

As an example from TABLE TWO, when the line "sysUpTime, 18987385" is passed into setDeviceStatus( ) of Parser, the Parser determines the type of status to be the system up time and its value to be 18987385. This information is then placed into the DeviceStatus structure.

Figure 16:
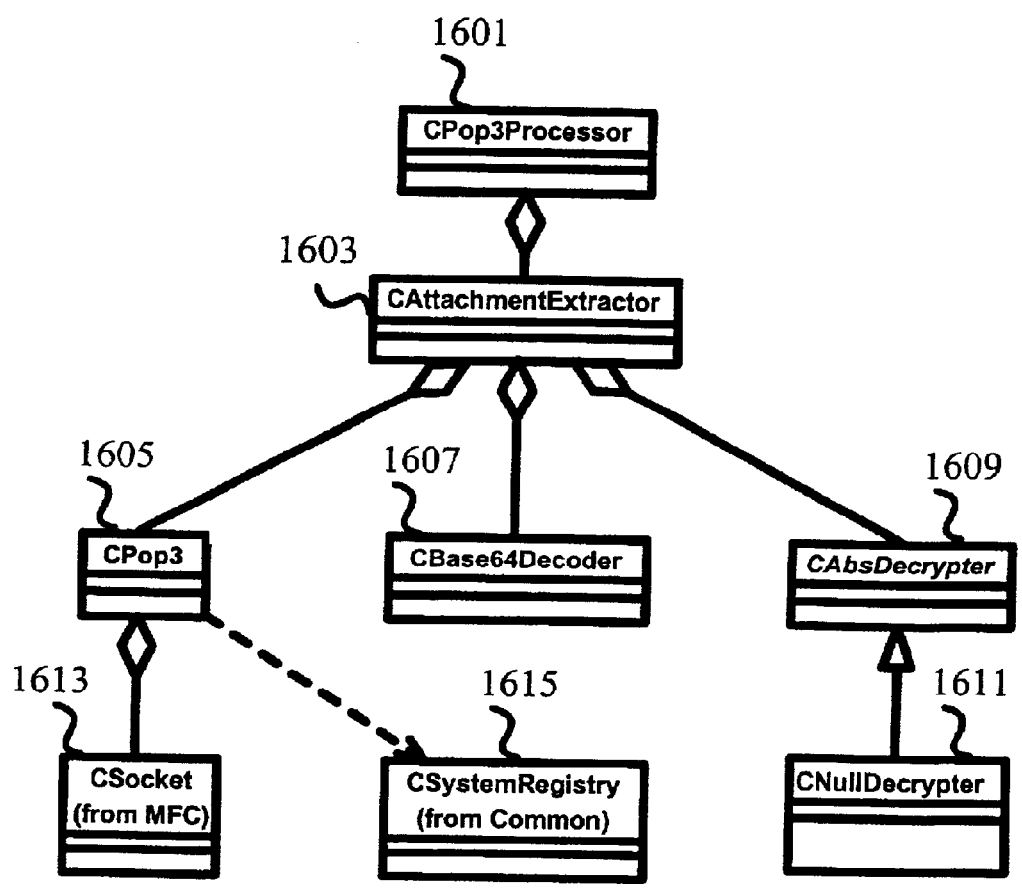
FIG. 16 illustrates a class structure of the POP3 Processor module 1207 (FIG. 12)

FIG. 16 illustrates an exemplary class diagram of POP3 Processor 1207 (FIG. 12). This module is responsible for obtaining the email messages containing information about the network devices from a POP3 server using the POP3 protocol. The information is in the MIME attachment of the email message. This module is responsible for decoding the MIME attachment using Base64 decoding and then decrypting the data. After this package obtains each email message, it erases the email message from the POP3 server.

POP3 Processor 1207 contains 6 classes: CPop3Processor 1601, CAttachmentExtractor 1603, CPop3 1605, CBase64Decoder 1607, CAbsDecrypter 1609, and CNullDecrypter 1611:

CPop3Processor 1601 is the interface to POP3 Processor 1207 to access the POP3 server to obtain the e-mail message that contains configuration information and status information.

CAttachmentExtractor 1603 is responsible for obtaining the MIME attachment from the e-mail messages in the POP3 server.

CPop31605 is responsible for performing post office protocol version 3 (POP3 ) for accessing the POP3 server.

CBase64 Decoder 1607 is responsible for performing Base64 decoding of the message in the MIME attachment.

CAbsDecrypter 1609 and CNullDecrypter 1611 are responsible for decrypting the message in the MIME attachment CAbsDecrypter 1609 is an abstract class and CNullDecrypter 1611 is a derived class of CAbsDecrypter 1609. This class structure allows for new decryption methods to be added to POP3 Processor 1207. By adding new derived classes of CAbsDecrypter 1609, new decryption methods are added. CNullDecrypter 1611 does not perform any decryption.

Other classes in FIG. 16 that are used by the above-listed classes in post office protocol 3 processor 1207 are:

CSocket 1613 (from Microsoft Foundation Classes (MFC)) is used by CPop3 1605 to execute the POP3 commands.

CSystemRegistry 1615 (the Common module, which contains those classes that can be used by all other modules in the system) is used by CPop3 1605 to obtain information from the system's registry needed to access the e-mail messages in the POP3 server.

Figure 17:
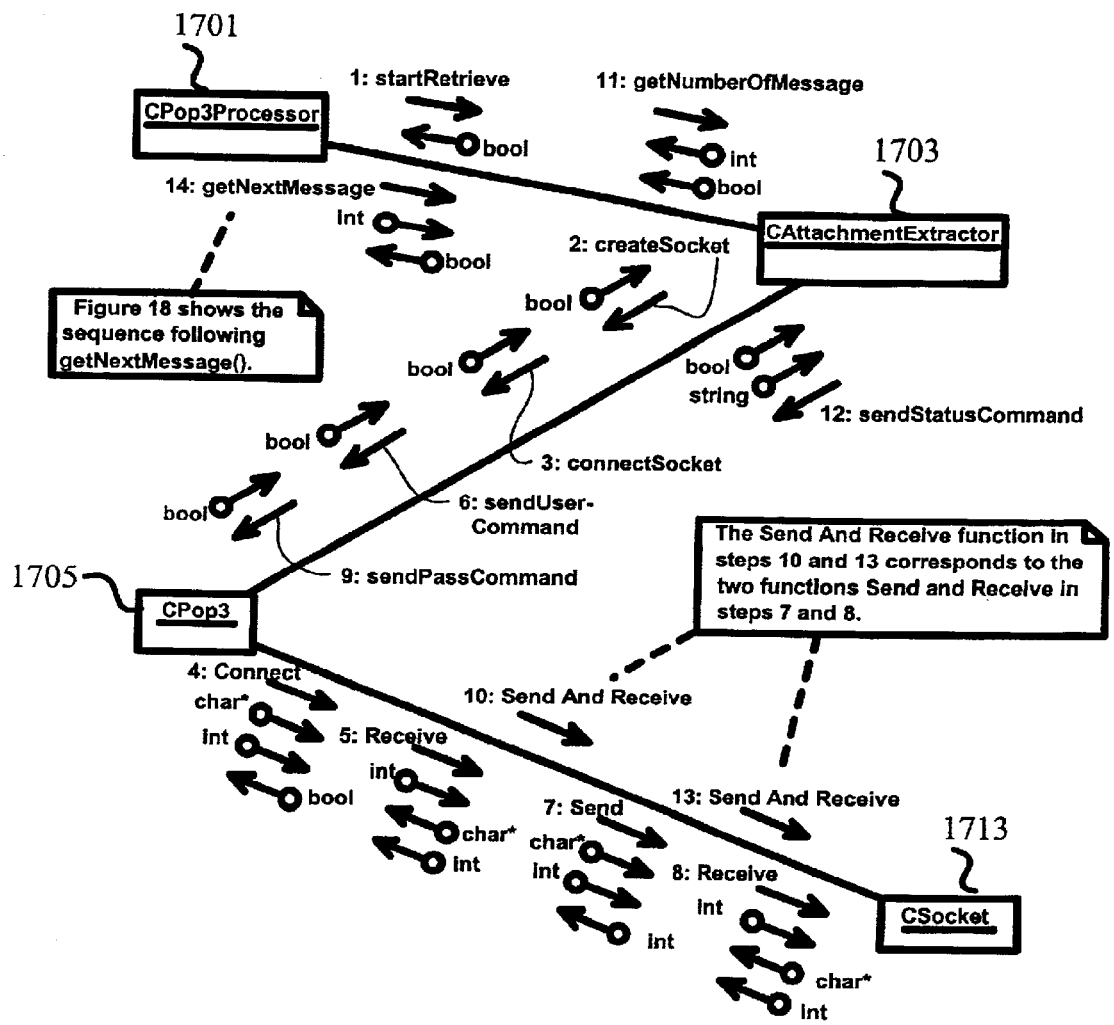
FIGS. 17 and 18 illustrate collaboration diagrams within the POP3 Processor module 1207.

FIG. 17 illustrates how the objects in FIG. 16 interact with each other to initiate retrieval of messages from the POP3 server.

CPop 3 Processor 1701 calls startRetrieve( ) of CAttachmentExtractor 1703. CAttachmentExtractor 1703 calls createSocket( ) of CPop3 1705 to create a socket in order to use POP3. CAttachmentExtractor 1703 calls connectSocket( ) of CPop3 1705 to connect to a socket through which the POP3 commands will be sent. CPop3 1705 calls Connect( ) and Receive( ) of CSocket 1713 to connect to a socket. CAttachmentExtractor 1703 sends the POP3 commands USER and PASS to access the e-mail messages of the POP3 server. For each of these functions, CPop3 1705 calls Send( ) and Receive( ) of CSocket 1713 to send the command to the socket and to obtain a response from the socket for each command. CPop3Processor 1701 calls getNumberOfmessage( ) of CAttachmentExtractor 1703 to obtain the number of messages in the POP3 server. CAttachmentExtractor 1703 calls sendStatusCommand( ) of CPop3 1705 to send the POP3 command STAT to obtain the number of messages. CPop3 1705 calls Send( ) and Receive( ) of CSocket 1713 to send the STAT command to the socket and to obtain a response from the socket for the command.

Figure 18:
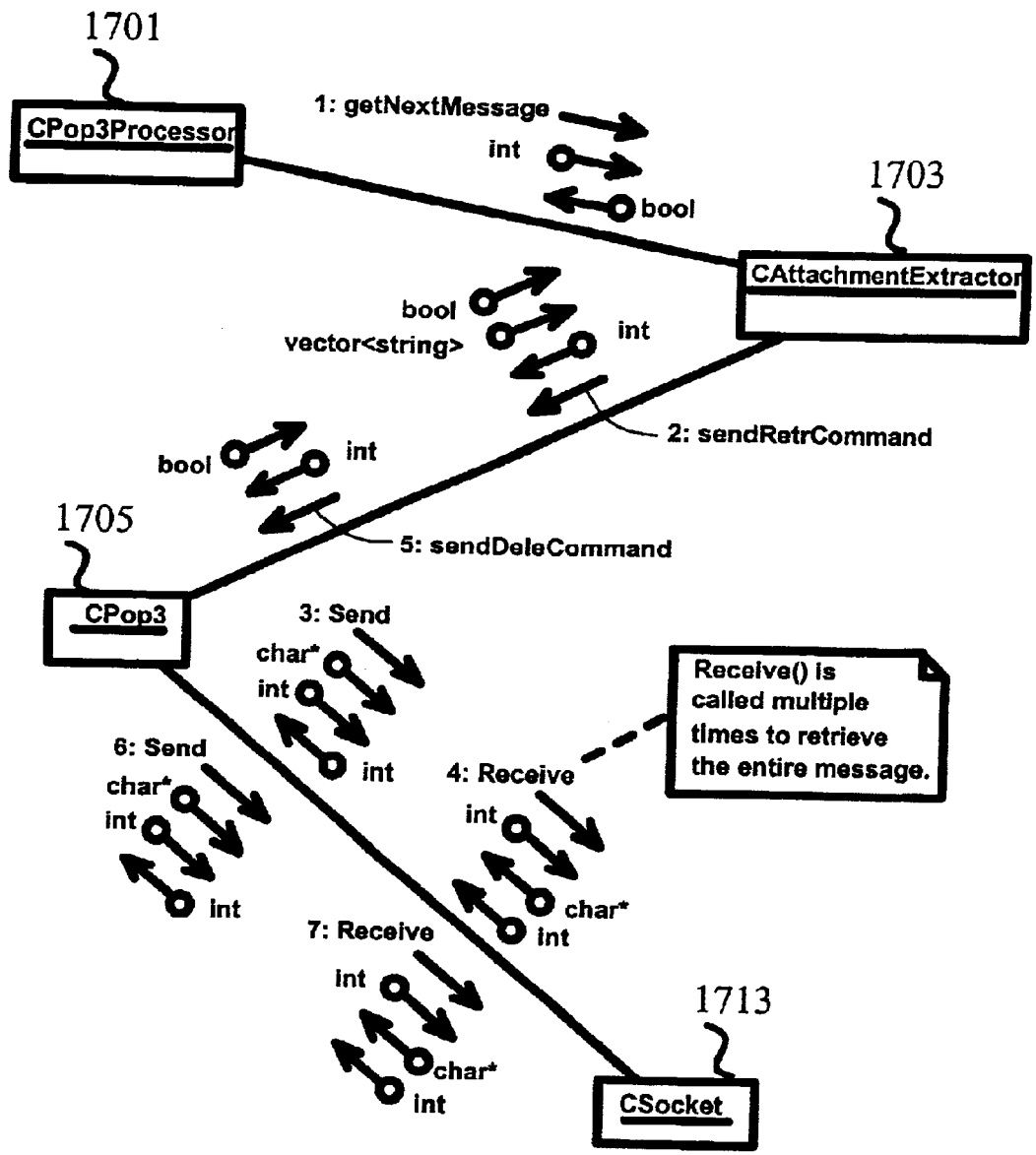

FIG. 18 illustrates how the objects in FIG. 16 interact with each other to retrieve a message from the POP3 server.

CPop3Processor 1701 calls getNextMessage( ) of CAttachmentExtractor 1703 to obtain the next message from the POP3 server. CAttachmentExtractor 1703 calls sendRetrCommand( ) of CPop31705 to send the POP3 command RETR to obtain the next message. CPop3 1705 calls Send( ) and Receive( ) of CSocket 1713 to send the RETR command to the socket and to obtain a message from the socket for the command. CAttachmentExtractor 1703 calls sendDeleCommand( ) of CPop3 1705 to send the POP3 command DELE to delete the message that was just retrieved. CPop3 1705 calls Send( ) and Receive( ) of CSocket 1713 to send the DELE command to the socket and to obtain a response from the socket for the command.

Figure 19:
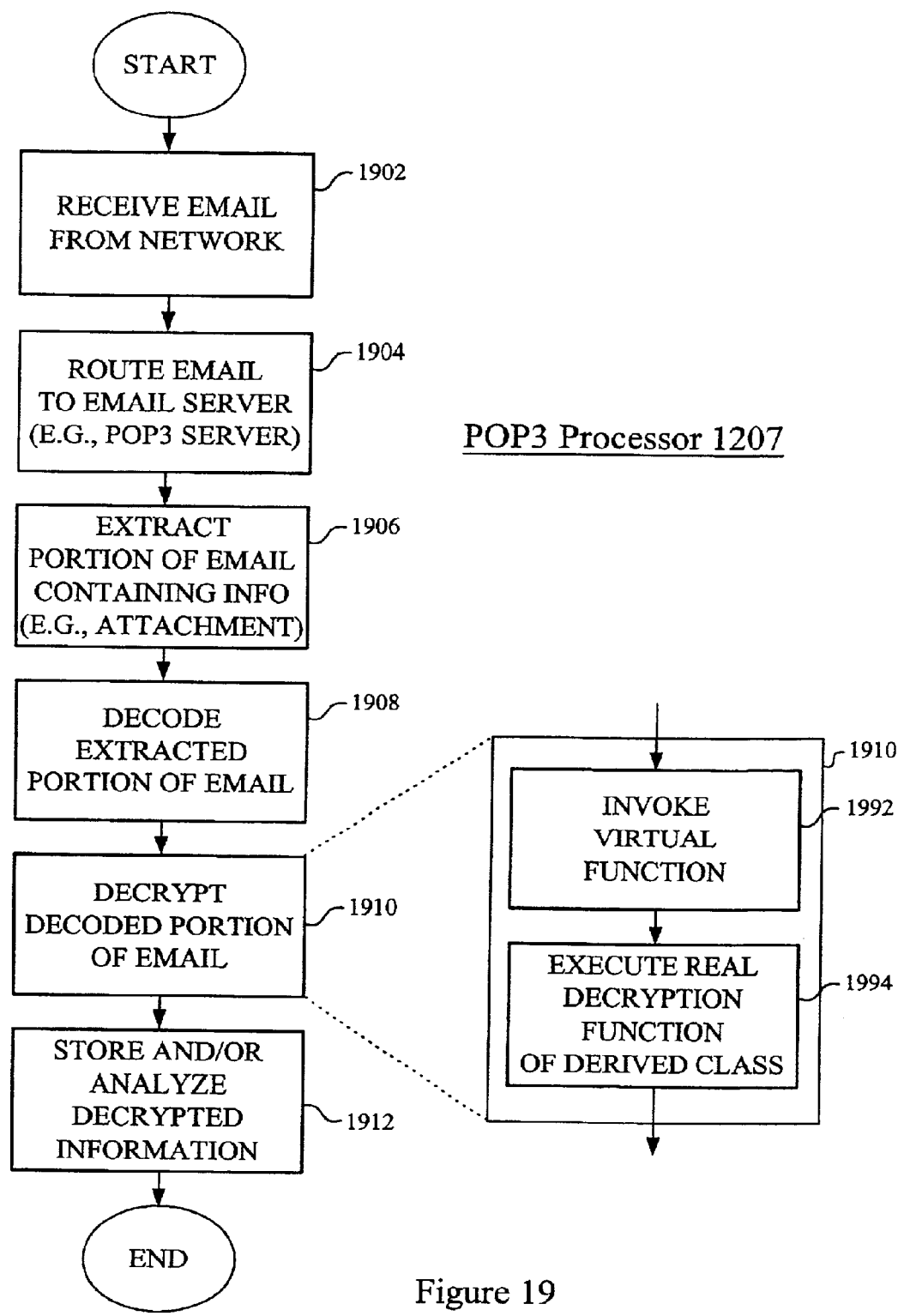
FIG. 19 is a flowchart illustrating a method that may be performed within the POP3 Processor module 1207.

FIG. 19 is a flowchart of a method by which information concerning a remotely monitored device and sent by email is received, routed, extracted from the email, decoded and decrypted, according to an exemplary embodiment of the invention. In this discussion, reference is made to the system block diagram of FIG. 9.

The process begins with the receipt of the email by, for example, firewall 941 (FIG. 9). The email containing the information may have travelled from a device 901, 903, 905, 907, via any of a variety of paths, including a firewall 917, LAN 920, LAN/Intranet 930, or the Internet. This receipt of the email is indicated by step 1902 (FIG. 19).

After the email is received, the process proceeds to step 1904, the routing of the received email to an email server such as a POP3 server. In FIG. 9, a POP3 server is illustrated as being in a dedicated computer 943, but it is understood that a monitoring workstation 945 or other processing device may itself include the email server to which the email may be directly routed.

After the email server in computer 943 or other processing device has received the email that has been routed to it, monitoring workstation 945 or other suitable processing device extracts the portion of the email containing the information concerning the monitored device. This extraction is shown as step 1906, and of course may be performed by the same or a different processing device as the one in which the email server is resident In a particular example, the information is contained in an attachment to the email, such as a MIME attachment. It is envisioned that this extraction step 1906 may be optional, and does not have to be executed in embodiments in which the entire email constitutes the information and there is no smaller "portion" of the email that needs to be extracted.

After workstation 945 has performed any necessary extraction from the email, the process continues to step 1908 in which workstation 945 decodes the portion of the email containing the information. The decoding corresponds to any encoding that is performed on the email at the sending end, and thus may constitute any appropriate decoding operation. In one embodiment, the decoding step 1908 involves decoding Base64-encoded data.

After the decoding is performed, the process proceeds to step 1910 which indicates workstation 945's decryption of the decoded portion of the email. The decryption is matched to the particular type of encryption used at the sending end, and may be involve of a variety of encryption techniques.

In a particular preferred embodiment, decryption step 1910 may be decomposed into blocks 1992 and 1994. Step 1992 represents the invoking of a virtual function such as that in abstract class CAbsDecrypter 1609 (FIG. 16). Step 1994 represents the execution of an actual (real) decryption function of a derived class. In the event that no encryption is used, then no decryption is used and a null class such as CNullDecrypter 1611 (FIG. 16) may be present According to this preferred embodiment of the invention, any of a variety of encryption and decryption techniques, or optionally no encryption and decryption at all, may be employed. This embodiment uses virtual function 1992 with a real decryption function 1994 that is part of a derived class of the class containing the virtual function. This allows a user the option to use a product with no encryption/decryption or a default encryption/decryption technique, or to add specific encryption/decryption techniques by adding derived classes in place of or in addition to CNullDecrypter 1611.

Finally, after any decryption has been completed, the process continues to step 1912 which indicates the storage in database 947, and/or analysis by workstation 945, of the decoded, decrypted information that has been extracted from the email sent from the monitored devices.

It is understood that the steps shown in the flowchart of FIG. 19 may be performed by elements other than those mentioned with reference to the system diagram shown in FIG. 9, and that the flowchart may be executed by any of various system architectures. Moreover, according to the particular architecture chosen, some of the steps of FIG. 19 may be omitted, or the ordering of the steps may be chosen to be compatible with a particular approach.

As described with reference to FIG. 16, a preferred embodiment involves object-oriented programming techniques, including use of abstract classes, derived classes and virtual functions. Specifically, a virtual function such as that in abstract class CAbsDecrypter 1609 may cause invocation of an actual (real) decryption function of a derived class such as CNullDecrypter 1611.

As known to those skilled in the art, object-oriented-technology is based on manipulation of software objects instantiated from software classes. A software class is a user-defined type and is typically declared with data items, and procedures or software methods that operate on the data items. Many high-level languages, including C++, support the declaration of classes. Software objects instantiated for software classes are called instances of the software classes from which they are instantiated, and have all the features of the "type" of the software class used for instantiation.

An abstract class is a software class that is not intended to be instantiated. A purpose of an abstract class is to define interfaces shared by derived classes through inheritance. An abstract class is frequently used with virtual functions or software methods that declare the interfaces with or without definitions. When a software class derived from an abstract class defines an inherited virtual function of the abstract class, the virtual function of the derived software class will be executed even when the instantiated object of the derived software class is accessed through a reference type of the base abstract class. If the function referenced is not a virtual function, the base class function or software method will be executed. This technique allows the client or user of the software object to execute the correct function or software method with only the knowledge of the abstract class. Many examples of such techniques are shown in Gamma, E., Helm, R, Johnson, R. and Vlissides, J., *Design Patterns: Elements of Reusable Software*, Addison-Wesley, Massachusetts, 1995, which is incorporated herein by reference.

Object-Oriented Programming ("OOP") is a programming methodology in which a program is viewed as a collection of discrete objects that are self-contained collections of data structures and routines that interact with other objects. A class has data items, structures, and functions or software methods. Data items correspond to variables and literals. Structures are named groupings of related data items and other structures. Software methods correspond to functions and subroutines. An object-oriented framework is a reusable basic design structure, including abstract and concrete classes, that assists in building applications.

As generally understood, a declaration of a data item, variable, function, or software method is a declaration of the name of the data item, variable, function, or software method. A definition of the data item, variable, function, or software method is the defining content for the data item, variable, function, or software method. For example, the declaration of a software method named "draw" includes the name and types of interfaces for the software method, but not the defining code. The definition of the software method named "draw" includes the name of the software method, any needed data type information, information concerning parameters to be passed, and the defining code for the software method. In some programming languages, a definition is also a declaration.

Three main features of object-oriented programming are inheritance, encapsulation, and polymorphism. Encapsulation and polymorphism are well known. Inheritance allows a programmer to establish a general software class with features desirable for a wide range of software objects. For example, if a programmer designs a software class "shape" having certain generalized features such as a closed convex shape and a generalized computable property called "draw," it is then possible to construct subclasses derived from the superclass "shape" such as subclasses "triangle," "square" and "circles," all having the shared properties of the parent class shape but with additional properties such as the lengths of sides or a radius value. It is also possible to have derived subclasses of classes that have additional properties such as a solid circle and a dashed circle.

In this example, the class "shape" is considered a base class, in that instantiations of actual objects are performed in its subclasses. The class "shape" is also considered an abstract class, in that it makes no sense to instantiate a "shape" object since object properties are not fully defined for the class "shape".

More generally, an abstract class is a class from which no objects are instantiated, but for which an interface for subclasses is established. The class "shape" establishes certain properties inherent to all "shape" subclasses for inheritance purposes. For example, an operation named "draw" of a shape, a commonly requested operation among users of shapes, can be declared as a software method for the class shape, to be inherited in all subclasses of the class shape. A programmer creates new classes derived from the class shape that inherit all desired features of the class shape without rewriting code already written for the class shape. This feature, called reusability, offers tremendous savings of time and resources in system development, maintenance, and support.

In many high-level programming languages, a programmer declares a derived class by providing the name of the class being declared and the names of base classes from which the derived class is to inherit properties. In the "shape" example, the class "shape" is considered to be at a top level of an inheritance hierarchy, and is abstract since it makes no sense to instantiate shape objects with no definition of an actual shape such as a square or a circle. Subclasses declared a level below the class shape are the subclasses specifically derived from the class shape, such as triangles, squares and circles. The subclasses "triangle," "square" and "circle" are then called children or subclasses of the class shape, and the class shape is called a parent or superclass of the classes "triangle," "square" and "circle."

Declarations of the subclasses specifically refer to the class "shape" for establishing inheritance. Subclasses a level below the class "circle" are the subclasses specifically derived from the class circle, such as "solid circle" and "dashed circle." The classes "solid circle" and "dashed circle" are then called children or subclasses of the class circle, and the class "circle" is called a parent or superclass of the classes "solid circle" and "dashed circle." Declarations of these subclasses specifically refer to the parent class "circle" for establishing inheritance. Since the class "circle" is derived from the class "shape," the derived classes "solid circle" and "dashed circle" inherit all features of the class "shape," and all additional features of the class "circle."

In object-oriented programming, a pure virtual function is a function or software method declared with no defining code in an abstract class. For example, in declaring the abstract class "shape" described previously, a programmer declares a pure virtual function named "draw," with no defining code, as a software method for the abstract class shape. Subclasses derived from the abstract class "shape" inherit the pure virtual function as a virtual function having the same name as the pure virtual function of the parent abstract class. The function name or software method name has executable code defined at some level in subclasses of the parent abstract class.

Assume the abstract class "shape" has a declaration for the pure virtual function named "draw." Using formulas from basic algebra and geometry, the actual code executed for drawing a shape differs from one shape to another, so the code for the function named "draw" is defined only in derived base classes used for instantiation of software objects. In C++, a virtual function is declared to be a virtual function in all abstract subclasses to be used as superclasses for derived subclasses from which objects are to be instantiated with defining code for the virtual function of the abstract classes.

For example, drawing a circle requires plotting points equidistant from a center point. Drawing a square generally requires plotting points to form four straight sides having equal length which are connected at right angles. Therefore, a request to draw a particular shape needs to accommodate the different properties of various desired shapes. Using a pure virtual function named "draw" in the abstract class "shape," the code for drawing a circle is included as a software method named "draw" for instantiated circle software objects, and the code for drawing a square is included as a software method named "draw" for instantiated square software objects. A reference to a software object instance of the software method named "draw" causes execution of the code to draw the shape represented by the software object instance. For this example, the shape of a circle is drawn if the code for an instantiated circle object is accessed, and a square is drawn if the code for an instantiated square object is accessed.

In C++, the code for the desired software method named "draw" is accessible by using a format including a reference to the desired circle or square instantiated software object and the name "draw." A comprehensive discussion of the pure virtual function property of abstract classes in C++ is provided in Stroustrup, B., *The Design and Evolution of C++*, Addison-Wesley, Massachusetts, 1994, and in Meyers, S., *Effective C++.50 Specific Ways to Improve Your Programs and Designs*, Addison-Wesley, Massachusetts, 1992, which are incorporated herein by reference.

Some object-oriented programming languages support multiple inheritance, in which a software class derived from plural existing parent software classes inherits attributes and software methods from all parent software classes included in the desired derivation. As discussed above with regard to inheritance, a child subclass is declared by supplying the name of the class to be declared, and the names of the desired parent base classes for multiple inheritance. Additional properties for the child subclass are then declared and/or defined.

A comprehensive discussion of OOP is provided in Coad, P. and Yourdon, E., *Object-Oriented Analysis, Second Edition*, Prentice-Hall, Inc., New Jersey, 1991, and in Booch, G., Object-Oriented Analysis and Design with Applications, Second Edition, Addison Wesley Longman, California, 1994, which are incorporated herein by reference.

In the described embodiment, abstract class CAbsDecrypter provides the interface function, decryptData( ), to perform the decryption process. The interface function is a pure virtual function so that the decryption method is not defined in the abstract class. The abstract class CAbsDecrypter cannot be instantiated.

The derived class CNullDecrypter of the abstract class CAbsDecrypter provides the method for performing the function decryptData( ). Accordingly, when decryptData( ) of CAbsDecrypter is called, it is actually decryptData( ) of CNullDecrypter that is being called. The caller of the decryptData( ) is not aware that it is using decryptData of CNullDecrypter. CAbsDecrypter hides the details of the decryption scheme.

Thus, new decryption scheme(s) can be used by adding new derived class(es) of CAbsDecrypter. The caller will be not be aware of which encryption scheme is being used but will call the interface function of CAbsDecrypter. In this manner, CAbsDecrypter may be used in accordance with the principle of "subclassing for specification," which is generally understood to involve a parent class specifying what must be done, but the subclasses overriding the parent's member class specifications and describing exactly how tasks are to be carried out.

In the described system, a derived class of CAbsDecrypter is created by CAttachmentExtractor. In a system that uses one derived class of CAbsDecrypter, an object of the class CNullDecrypter is created. The object of the class CNullDecrypter is assigned to an object of the class CAbsDecrypter. Accordingly, whenever the object of the class CAbsDecrypter is used, it is actually the object of the class CNullDecrypter that is being used.

TABLE THREE shows an example of code for creating and using a derived class of CAbsDecrypter.

TABLE THREE

Exemplary Code Implementing Creation and Use of Derived Class

```
CAbsDecrypter* loc_pDecrypter;
    //Declare a local pointer to an object of the
    //abstract class CAbsDecrypter.
loc_pDecrypter = new CNullDecrypter;
    //Create a CNullDecrypter object and
    //assign it to the pointer to an object of the
    //abstract class CAbsDecrypter.
loc_pDecrypter → decryptData( );
    //Using the decryption process.
```

Changing the second step in TABLE THREE, by creating different derived classes of CAbsDecrypter, changes the decryption scheme.

Application of these principles of use of abstract classes, derived classes and virtual functions is further described with reference to FIGS. 20A and 20B.

Figure 20A:
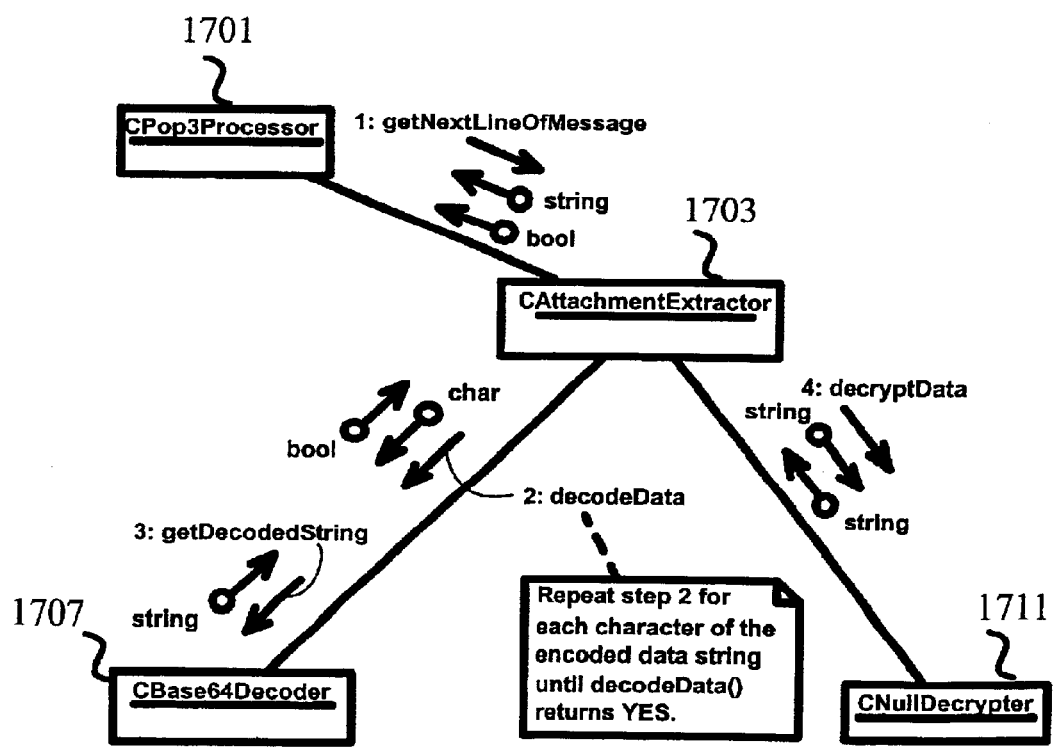
FIGS. 20A, 20B, 21, and 22 illustrate additional collaboration diagrams within the POP3 Processor module 1207.

FIG. 20A illustrates how the objects in FIG. 16 interact with each other to retrieve a line from the MIME attachment of a message from the POP3 server.

CPop3Processor 1701 calls getNextLineOfMessage( ) of CAttachmentExtractor 1703 to obtain a line from the MIME attachment of a message from the POP3 server. CAttachmentExtractor 1703 calls decodeData( ) and getDecodedString( ) of CBase64 Decoder 1707 to decode a line from the MIME attachment. CAttachmentExtractor 1703 calls decryptData( ) to decrypt a line of decoded string.

Figure 20B:
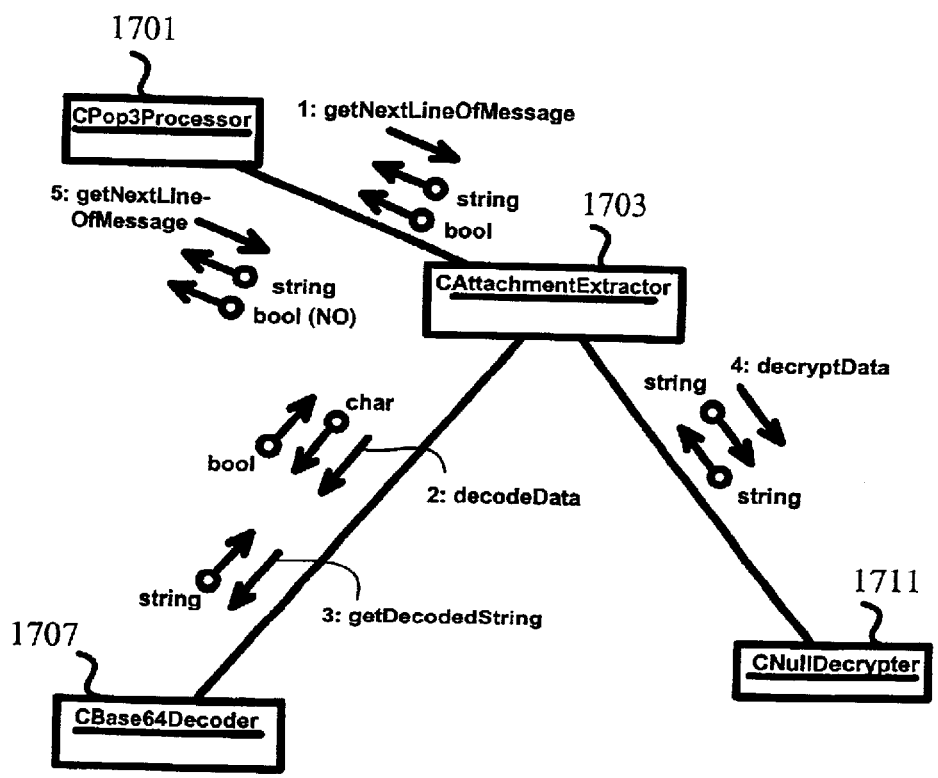

FIG. 20B illustrates how the objects in FIG. 16 interact with each other to retrieve the last line from the MIME attachment of a message from the POP3 server. FIG. 20B includes the steps like those in FIG. 20A, but adds another call of getNextLineOfMessage( ) that returns a NO result to indicate there are no more lines in the message.

CPop3Processor 1701 calls getNextLineOfMessage( ) of CAttachmentExtractor 1703 to obtain a line from the MIME attachment of a message from the POP3 server. CAttachmentExtractor 1703 calls decodeData( ) and getDecodedString( ) of CBase64Decoder 1707 to decode a line from the MIME attachment. CAttachmentExtractor 1703 calls decryptData( ) to decrypt a line of decoded string.

CPop3Processor 1701 calls getNextLineOfMessage( ) again of CAttachmentExtractor 1703 to obtain a line from the MIME attachment of a message from the POP3 server. However, this call returns NO to indicate there are no more lines in the message.

Figure 21:
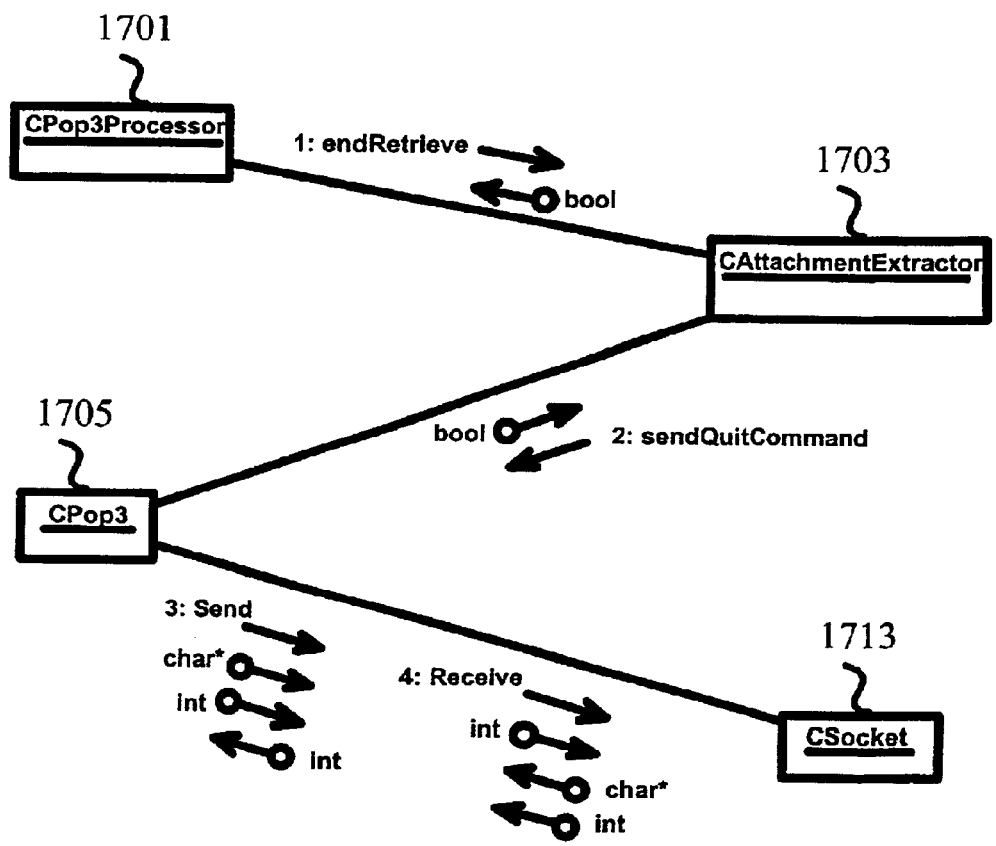

FIG. 21 illustrates how the objects in FIG. 16 interact with each other to end a session with the POP3 server in retrieving messages.

CPop3Processor 1701 calls endRetrieve( ) of CAttachmentExtractor 1703 to end a session with the POP3 server. CAttachmentExtractor 1703 calls sendQuitCommand( ) of CPop3 1705 to send the POP3 command QUIT. CPop3 1705 calls Send( ) and Receive( ) of CSocket 1713 to send the QUIT command to the socket and to obtain a response from the socket for the command.

Figure 22:
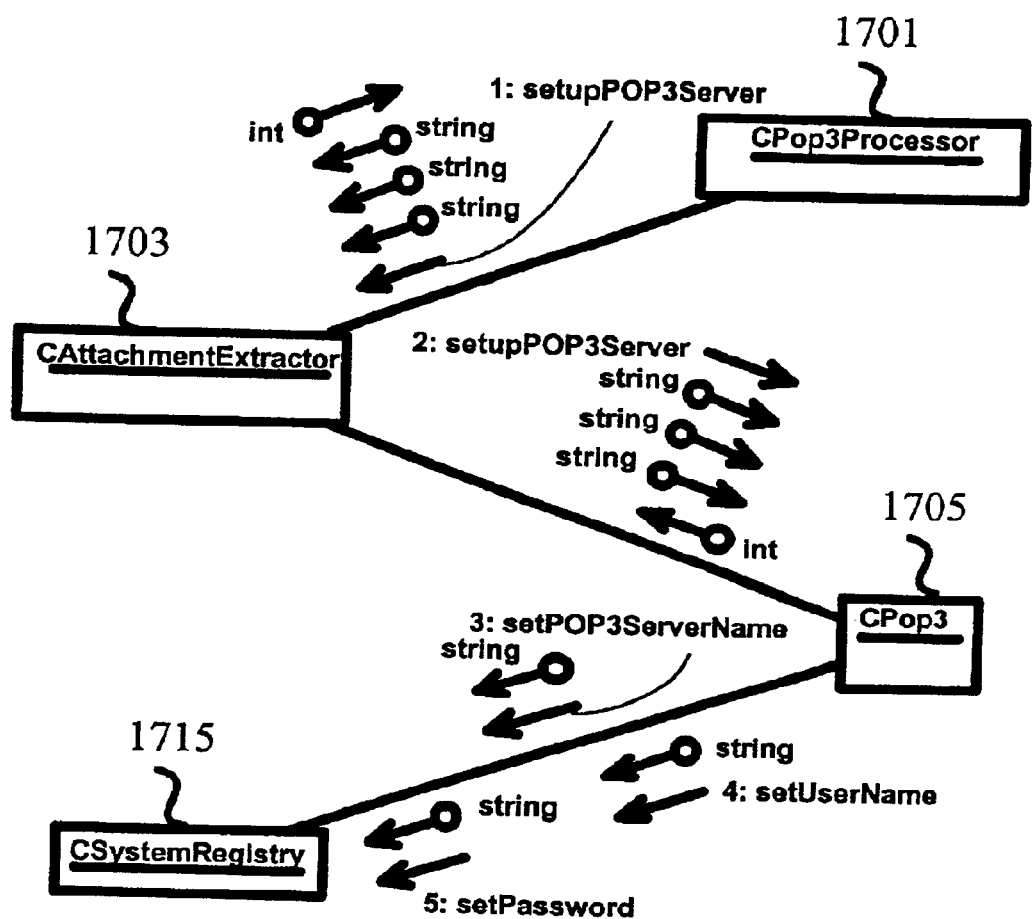

FIG. 22 illustrates how the objects in FIG. 16 interact with each other to set the information needed in order to access the POP3 server.

CPop3Processor 1701 calls setupPOP3Server( ) of CAttachmentExtractor 1703. CAttachmentExtractor 1703 calls setupPOP3Server( ) of CPop3 1705. CPop3 1705 calls setPOP3 ServerName( ), setUserName( ), and setPassword( ) of CSystemRegistry 1715 to set information about access to the POP3 server in the registry.

Figure 23:
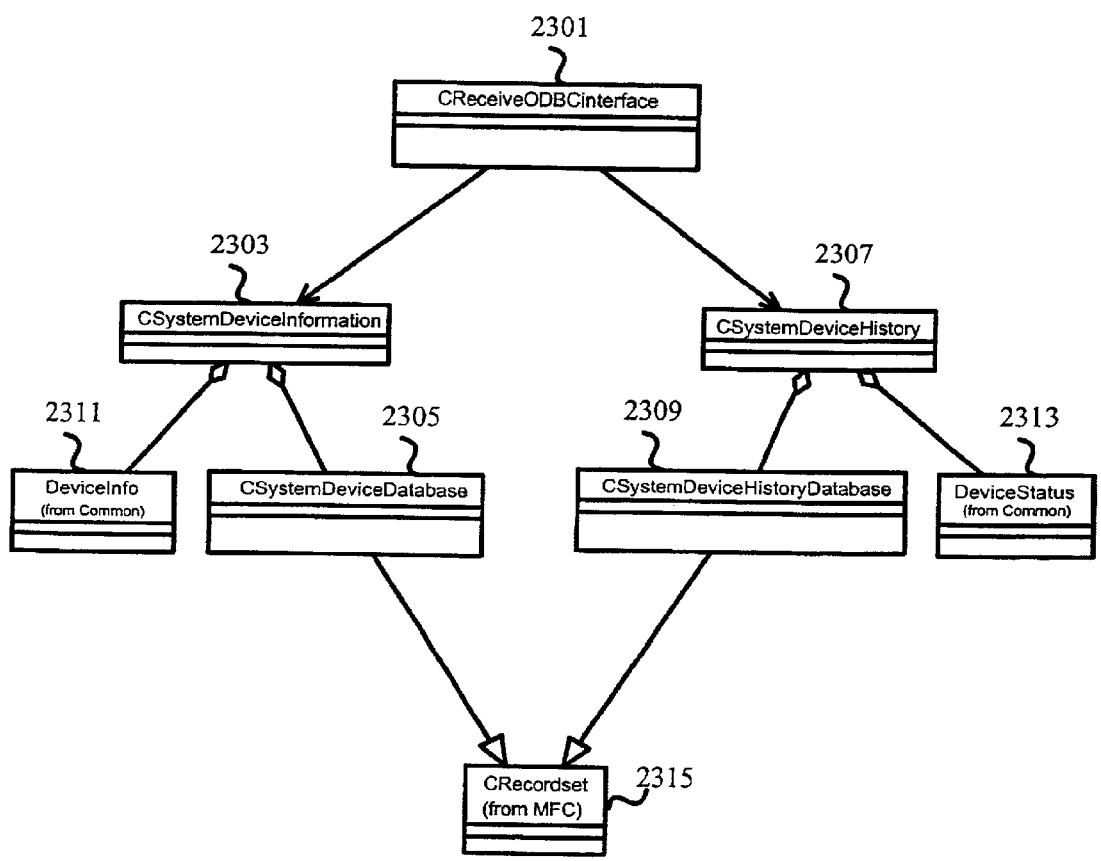
FIG. 23 illustrates a class diagram of the ODBC (Open DataBase Connectivity) Interface module 1209 (FIG. 12)

FIG. 23 illustrates an exemplary class diagram of ODBC (Open DataBase Connectivity) Interface 1209 (FIG. 12). The ODBC Interface module 1209 is responsible for providing the interface to the two tables in the database that keeps the information of SNMP devices and their status. This design requires the database to be registered in ODBC. Therefore, the database must have ODBC supporting drivers.

ODBC Interface 1209 contains five classes: CReceiveODBCInterface 2301, CSystemDeviceInformation 2303, CSystemDeviceDatabase 2305, CSystemDeviceHistory 2307, and CSystemDeviceHistoryDatabase 2309:
CReceiveODBCInterface 2301 is the interface to ODBC Interface 1209 (FIG. 12) to store information in the database.
CSystemDeviceInformation 2303 is responsible for storing configuration information of the monitored device in the database.
CSystemDeviceDatabase 2305 is responsible for providing an interface between CSystemDeviceInformation 2303 and the actual database that contains the configuration information.
CSystemDeviceHistory 2307 is responsible for storing status information of the monitored device in the database.
CSystemDeviceHistoryDatabase 2309 is responsible for providing an interface between CSystemDeviceHistory 2307 and the actual database that contains the status information.
Structures that are used by these classes include:
DeviceInfo 2311 is a structure used by CSystemDeviceInformation 2303 to store the configuration information.
DeviceStatus 2313 is a structure used by CSystemDeviceHistory 2307 to store the status information.
CRecordset 2315 is the class from which both CSystemDeviceDatabase 2305 and CSystemDeviceHistoryDatabase 2309 are derived, that interfaces with the databases.

Figure 24:
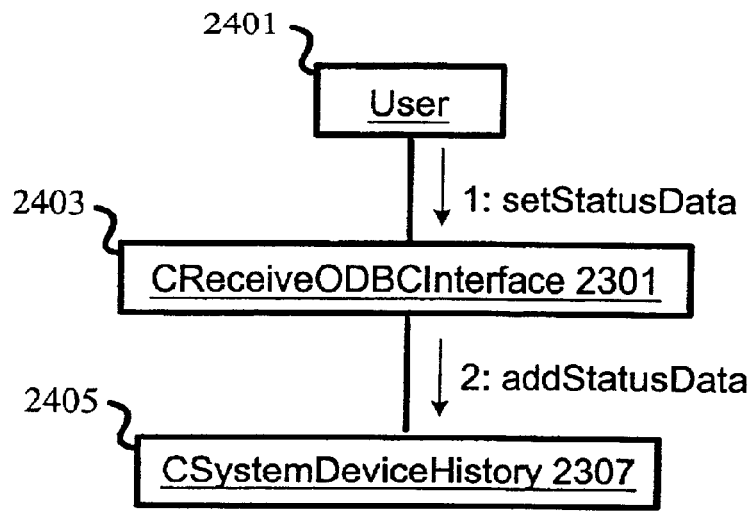
FIGS. 24 and 25 illustrate collaboration diagrams within the ODBC Interface module.
Figure 25:
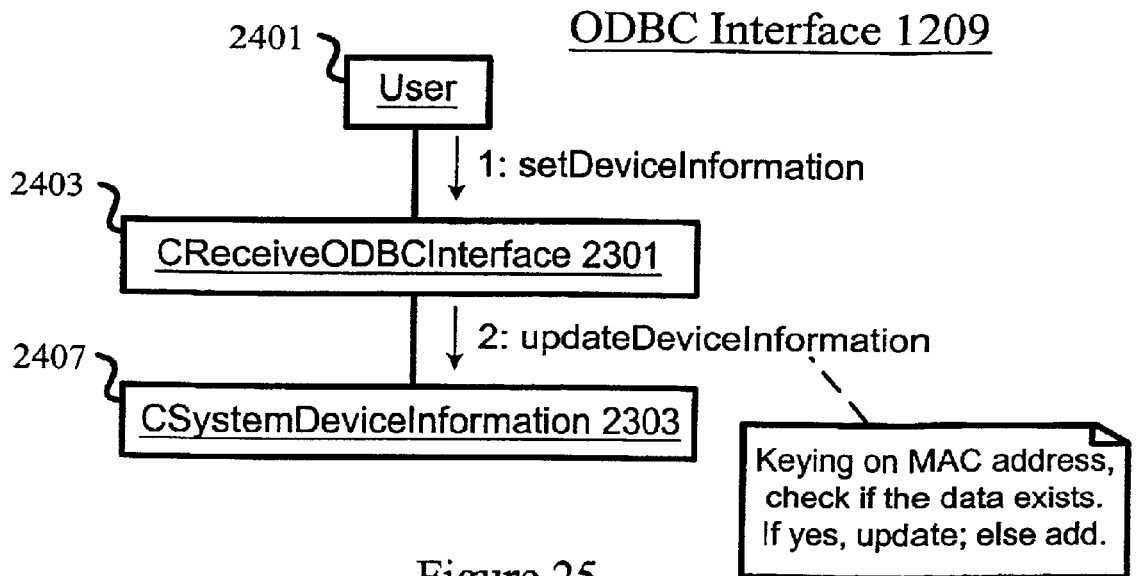

FIGS. 24 and 25 are collaboration diagrams showing how the objects in FIG. 23 interact with each other to store status and configuration information of the monitored devices into the database.

FIG. 24 illustrates how the objects in FIG. 23 interact with each other to add the status information of the monitored devices to the database.

User 2401 refers to the Receiver Manager 1203 (FIG. 12). After Receiver Manager 1203 obtains the status information from the email message (stored in the DeviceStatus structure 2313), Receiver Manager 1203 calls the setStatusData( ) function of CReceiveODBCInterface 2301 (FIG. 23), passing the DeviceStatus structure 2313 into this setStatusData( ) function. CReceiveODBCInterface 2301 calls the addStatusData( ) function of CSystemDeviceHistory 2307, passing the DeviceStatus structure 2313 into this addStatusData( ) function. In the addStatusData( ) function of CSystemDeviceHistory 2307, the status information stored in the DeviceStatus structure 2313 is copied into a new record entry of the database. Thus, a new record is added to the database, containing the information copied from the DeviceStatus structure 2313.

FIG. 25 illustrates how the objects in FIG. 23 interact with each other to set the configuration information of the monitored devices to the database.

User 2401 refers to the Receiver Manager 1203 (FIG. 12). After Receiver Manager 1203 obtains the configuration information from the email message (stored in the DeviceInfo structure 2311), Receiver Manager 2301 calls the setDeviceInformation( ) function of CReceiveODBCInterface 2301 (FIG. 23), passing the DeviceInfo structure 2311 into this setDeviceInformation( ) function. CReceiveODBCInterface 2301 calls the updateDeviceInformation( ) function of CSystemDeviceInformation, passing the DeviceInfo structure 2311 into this updateDeviceInformation( ) function The updateDeviceInformation( ) function of CSystemDeviceInformation 2303, searches the database to see if the monitored device already exists in the database. This search may be accomplished, for example, by checking if the MAC Address in the DeviceInfo structure 2311 exists in the database. If the MAC address already exists in the database, then the information stored in the DeviceInfo structure 2311 is copied into the record entry of the database for the MAC Address, overwriting any existing configuration information for the monitored device. If the MAC address does not already exist in the database, the configuration information stored in the DeviceInfo structure 2311 is copied into a new record entry of the database, and thus a new record is added to the database containing the information copied from the DeviceInfo structure 2311.

TABLE FOUR describes the contents of an exemplary structure used to store configuration information concerning a monitored device.

TABLE FOUR

DeviceInfo Specification: Data Structure Storing Configuration Information

| Type | Name | Description |
| --- | --- | --- |
| std::string | m_sManufacturer | Manufacturer of the network printer. |
| std::string | m_sModel | Model of the network printer. |
| std::string | m_sSerialNumber | Network printer's serial number (if not available, string is empty). |
| std::string | m_sMACAddress | Network printer's MAC address (obtained from network printer through SNMP) |
| std::string | m_sIPAddress | IP address of the network printer. |
| std::string | m_sCompanyName | Name of company owning the network printer. |
| std::string | m_sStreet | Street address of the company. |
| std::string | m_sCity | City where the company is located. |
| std::string | m_sState | State where the company is located. |
| std::string | m_sZipCode | ZIP code of the company. |
| std::string | m_sLocation | Location within company of network printer. |
| std::string | m_sContactPerson | Name of contact person for network printer. |
| std::string | m_sPhoneNumber | Phone number of the contact person. |
| std::string | m_sEMailAddress | E-mail address of the contact person. |

Information in the email messages containing the configuration information are extracted and placed into this data structure. This data structure is passed into CReceiveODBCInterface 2301 through the function setDeviceInformation( ) and into CSystemDeviceInformation 2303 through the function updateDeviceInformation( ) as shown in FIG. 24. CSystemDeviceInformation 2303 extracts the information from the data structure and stores it in the database.

Figures 26A, 26B:
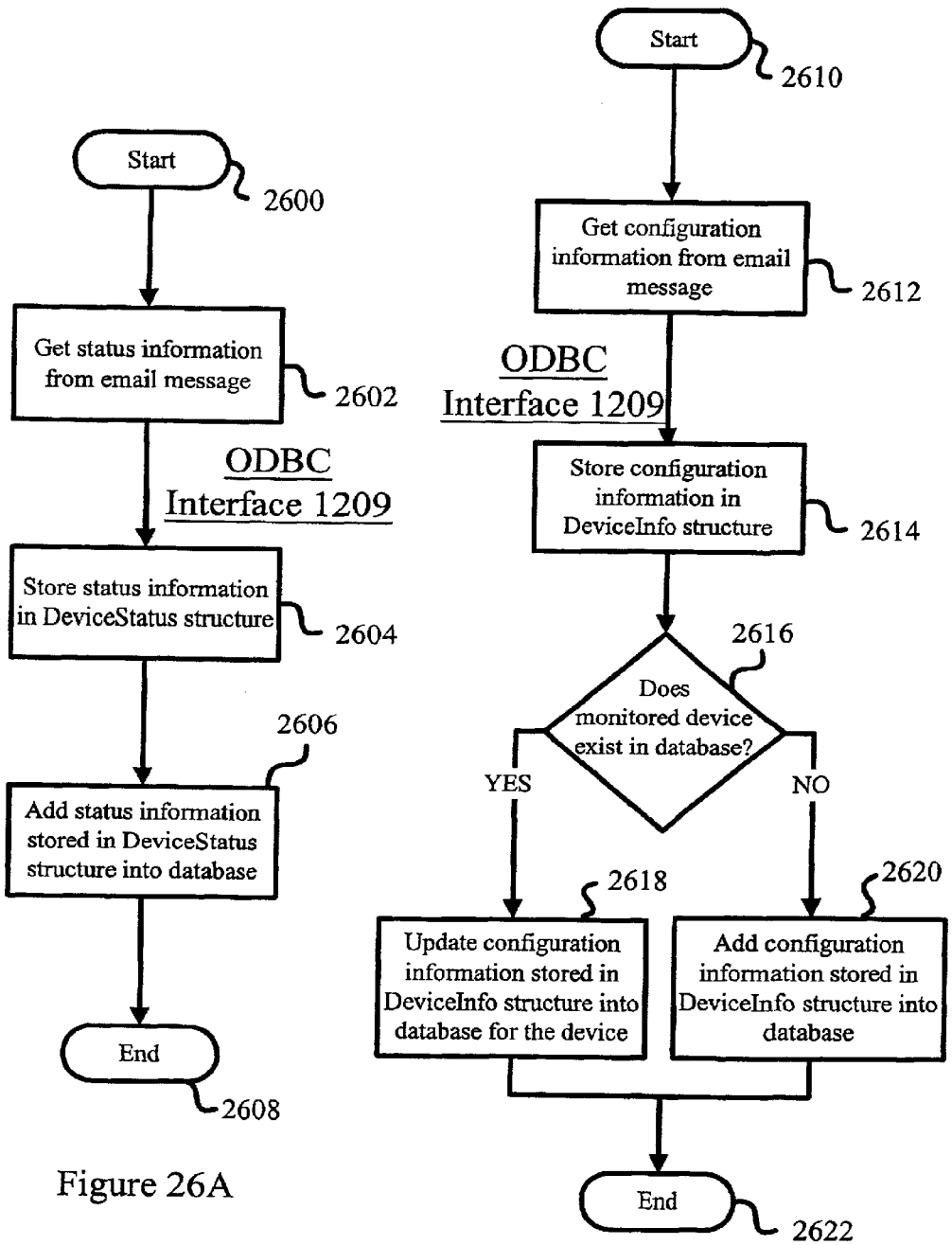
FIGS. 26A and 26B are flowcharts illustrating processes of getting status and configuration information, respectively, from the email message and storing the information in the database.

FIGS. 26A and 26B are flowcharts illustrating the above-described processes of getting status and configuration information, respectively, from the email message and storing the information in the database.

FIG. 26A shows the steps of getting the status information from the email message (step 2602), storing the status information into the DeviceStatus structure (step 2604), and then adding the status information to the database (step 2606).

FIG. 26B shows the steps of getting the configuration information from the email message (step 2612), storing the configuration information into the DeviceInfo structure (step 2614), and then updating a record in the database (step 2618) or adding a record to the database (step 2620) for the configuration information, depending on a decision (step 2616) whether or not the monitored device is already in the database.

TABLE FIVE describes the contents of the structure used to store the status information concerning the monitored device.

TABLE FIVE

DeviceStatus Specification: Data Structure Storing Status Information

| Type | Name | Description |
| --- | --- | --- |
| CTime | m_Time | Time sent from the monitored site |
| std::string | m_sMACAddress | MAC address of the device |
| std::string | m_sIPAddress | IP address of the device |
| unsigned int | m_nSysUpTime | Time (to 0.01 second) since network management portion was re-initialized. |
| unsigned int | m_nHrDeviceErrors | Number of errors detected on this device. |
| int | m_nPrinterStatus | Printer's status: other(1), unknown(2), idle(3), printing(4), warmup(5). |
| unsigned char | m_nLowPaper | Low paper error detected |
| unsigned char | m_nNoPaper | No paper error detected |
| unsigned char | m_nLowToner | Low Toner error detected |
| unsigned char | m_nNoToner | No Toner error detected |
| unsigned char | m_nDoorOpen | Door Open error detected |
| unsigned char | m_nJammed | Jammed error detected |
| unsigned char | m_nOffline | Offline error status detected |
| unsigned char | m_nServiceRequested | Service Request error detected |
| unsigned int | m_nPrtGeneralConfigChanges | Counts configuration changes that change the capabilities of a printer. |
| unsigned int | m_nPrtLifeCount | Number of units of measure (specified by CounterUnit) counted during Life of printer. |
| int | m_nPrtMarkerSuppliesLevel1 | Toner 1 level |
| int | m_nPrtMarkerSuppliesLevel2 | Toner 2 level |
| int | m_nPrtMarkerSuppliesLevel3 | Toner 3 level |
| int | m_nPrtMarkerSuppliesLevel4 | Toner 4 level |

Information in the email messages containing the status information are extracted and placed into this data structure. This data structure is passed into CReceiveODBCInterface 2301 through the function setStatusData( ) and into CSystemDeviceHistory 2307 through the function addStatusData( ) as shown in FIG. 24. CSystemDeviceHistory 2307 extracts the information from the data structure and stores it in the database.

To summarize TABLES ONE, TWO, FOUR and FIVE, the data structure DeviceInfo exemplified in TABLE FOUR contains the configuration information. An example of the format of an email message containing the configuration information is shown in TABLE ONE. TABLE ONE includes lines of text for the email message, but does not represent a data structure itself. The exemplary format does not show all the configuration information corresponding to the data structure DeviceInfo, and does not require that all the configuration information, except the MACAddress, be included in the email message. As the Parser receives each line of the mail message for the configuration information, it determines the type of configuration information and then determines the value of the type. The value is then stored in the data structure DeviceInfo (see FIG. 23).

Analogously, the data structure DeviceStatus exemplified in TABLE FIVE contains the status information. An example of the format of an email message containing the status information is shown in TABLE TWO. TABLE TWO includes lines of text for the email message, but does not represent a data structure itself. The exemplary format does not show all the status information corresponding to the data structure DeviceStatus, and does not require that all the status information, except the MACAddress, be included in the email message. As the Parser receives each line of the email message for the status information, it determines the type of status information and then determines the value of the type. The value is then stored in the data structure DeviceStatus (see FIG. 23).

Modifications and variations of the above-described embodiments of the present invention are possible, as appreciated by those skilled in the art in light of the above teachings. For example, the disclosed classes and subclasses, and the derivation relationships among the classes, and even the object-oriented approach that underlies the foregoing presentation, are provided by way of example and should not limit the scope of the invention. It is therefore to be understood that, within the scope of the appended claims and their equivalents, the invention may be practiced otherwise that as specifically described.

What is claimed is:

1. A method of retrieving from an email message, information concerning at least one remotely monitored device, the method comprising:
   a) obtaining a line of the email message containing the information;
   b) decoding the line obtained from the email message if it has been encoded; and
   c) decrypting the decoded line using an abstract decrypter class configured to perform a virtual function and using any one of a plurality of derived decrypter classes each of which is configured as a derived class of the abstract decrypter class;
   wherein the abstract decrypter class and the any one of the derived decrypter classes are collectively configured to decrypt the decoded email message, using the any one of the derived decrypter classes with the abstract decrypter class without having to modify the abstract decrypter class.

2. A system of retrieving from an email message, information concerning at least one remotely monitored device, the system comprising:
   a) means for obtaining a line of the email message containing the information;
   b) means for decoding the line obtained from the email message if it has been encoded; and
   c) means for decrypting the decoded line using an abstract decrypter class configured to perform a virtual function and using any one of a plurality of derived decrypter classes each of which is configured as a derived class of the abstract decrypter class;
   wherein the abstract decrypter class and the any one of the derived decrypter classes are collectively configured to decrypt the decoded email message, using the any one of the derived decrypter classes with the abstract decrypter class without having to modify the abstract decrypter class.

3. In a system for remotely monitoring devices by using a predetermined email protocol in sending information concerning at least one of the devices in an email message to a receiver including an email processing module, wherein the email processing module is structured to include:
   i) an interface class configured to access an email server that is governed by the predetermined email protocol, and to obtain an email message that contains the information;
   ii) an extractor class configured to extract a portion of the obtained email message that contains the information;
   iii) a decoder class configured to decode the portion of the email message;
   iv) an abstract decrypter class configured to perform a virtual function; and
   v) a derived decrypter class configured as a derived class of the abstract decrypter class, wherein the abstract decrypter class and any derived decrypter class are collectively configured to decrypt the decoded email message;
a method of retrieving the information from the email message, the method comprising:
   a) the interface class invoking a first function in the extractor class to obtain a line of the email message;
   b) the extractor class invoking second functions in the decoder class to decode the line obtained from the email message and to return the decoded line to the extractor class; and
   c) the extractor class invoking a third function in the derived decrypter class to decrypt the decoded line.

4. The method of claim 3, further comprising:
   repeating the interface class' invoking the first function in the extractor class to obtain a line of the email message until a last line of the email message has been obtained.

5. The method of claim 3, wherein:
   the information is included in an attachment to the email messages; and
   the extractor class is configured to extract the attachment from the email messages.

6. The method of claim 5, wherein:
   the attachment is a MIME attachment.

7. The method of claim 3, wherein:
   the decoder class is configured to perform Base64 decoding of the extracted email message.

8. The method of claim 3, further comprising:
   using a second derived decrypter class, distinct from the decrypter class, that is configured as a derived class of the abstract decrypter class, so that the abstract decrypter class and the second derived decrypter class are collectively configured to decrypt the decoded email message without changing the abstract decrypter class.

9. The method of claim 3, wherein:
   the predetermined email protocol is Post Office Protocol 3 (POP3 ).

10. In a system for remotely monitoring devices by using an SMTP email protocol to retrieve information concerning at least one of the devices in a MIME attachment of an email message to a receiver including a POP3 processing module, wherein the POP3 processing module is structured to include:

i) an interface class configured to access an email server that is governed by the POP3 protocol, and to obtain the email message including the MIME attachment that contains the information;

ii) an extractor class configured to extract the MIME attachment from the email message;

iii) a decoder class configured to perform Base64 decoding of the extracted MIME attachment;

iv) an abstract decrypter class configured to perform a virtual function; and v) first and second derived decrypter classes, each configured as a derived class of the abstract decrypter class, wherein each abstract decrypter class and any derived decrypter class are collectively configured to decrypt the decoded MIME attachment without having to modify the abstract decrypter class;

a method of retrieving the information from the MIME attachment to the email message, the method comprising:

a) the interface class invoking a first function in the extractor class to obtain a line of the MIME attachment;

b) the extractor class invoking second functions in the decoder class to decode the line of the MIME attachment and to return a decoded line to the extractor class;

c) the extractor class invoking a third function in the derived decrypter class to decrypt the decoded line; and d) repeating the interface class' invoking the first function in the extractor class to obtain a line of the MIME attachment until a last line of the MIME attachment has been obtained.

11. An email processing module especially suitable for use with a receiver of a system for remotely monitoring devices by using a predetermined email protocol in retrieving information concerning at least one of the devices in an email message, wherein the email processing module comprises:

a) an interface class configured to access an email server that is governed by the predetermined email protocol, and to obtain the email message that contains the information;

b) an extractor class configured to extract a portion of the obtained email message that contains the information;

c) a decoder class configured to decode the portion of the email message;

d) an abstract decrypter class configured to perform a virtual function; and e) a derived decrypter class configured as a derived class of the abstract decrypter class;

wherein the abstract decrypter class and any derived decrypter class are collectively configured to decrypt the decoded email message without having to modify the abstract decrypter class.

* * * * *